United States Patent [19]

Konzal et al.

[11] Patent Number: 4,817,366

[45] Date of Patent: Apr. 4, 1989

[54] HIGH CAPACITY PACKAGE SEAL, SEVER, AND BRICK APPARATUS AND METHOD

[75] Inventors: Daryl Konzal, Colgate; Gunars Salnajs, Milwaukee, both of Wis.

[73] Assignee: International Paper Company, Purchase, N.Y.

[21] Appl. No.: 942,986

[22] Filed: Dec. 17, 1986

[51] Int. Cl.⁴ .................. B65B 9/08; B65B 51/22; B65B 51/30; B65B 61/24

[52] U.S. Cl. ..................... 53/451; 53/456; 53/113; 53/551; 53/552; 53/373; 53/379; 156/272.4; 156/273.7; 219/10.75

[58] Field of Search ............. 53/436, 439, 451, 526, 53/529, 551, 552, 373, 379, DIG. 2, 113, 503, 456; 156/272.4, 273.7; 219/10.75

[56] References Cited

U.S. PATENT DOCUMENTS

| | | |
|---|---|---|
| 1,313,234 | 8/1919 | Jones . |
| 1,944,147 | 1/1934 | Aldrich . |
| 2,214,944 | 9/1940 | Vogt . |
| 2,479,375 | 8/1949 | Langer ..................... 219/19 |
| 2,492,530 | 12/1949 | Kriegsheim ............. 219/47 |
| 2,522,682 | 9/1950 | Lewis . |
| 2,542,901 | 2/1951 | Chaffee ..................... 154/42 |
| 2,602,276 | 7/1952 | Campbell . |
| 2,611,225 | 9/1952 | Williams . |
| 2,621,704 | 12/1952 | Langer ..................... 154/42 |
| 2,738,631 | 3/1956 | Järund ..................... 53/551 |
| 2,741,079 | 4/1956 | Rausing . |
| 2,784,540 | 3/1957 | Jarund . |
| 2,869,298 | 1/1959 | Zwoyer . |
| 2,920,173 | 1/1960 | Wastberg . |
| 2,928,219 | 3/1960 | Gubler . |
| 2,966,021 | 12/1960 | Lane et al. . |
| 2,976,657 | 3/1961 | Cloud . |
| 2,997,831 | 8/1961 | Neuendorf et al. . |
| 2,998,340 | 8/1961 | Conway et al. . |
| 3,006,121 | 10/1961 | Omori . |
| 3,026,658 | 3/1962 | Schneider et al. . |
| 3,027,696 | 4/1962 | Leasure . |
| 3,028,796 | 4/1962 | Neuendorf et al. . |
| 3,041,941 | 7/1962 | Danielzig . |
| 3,048,951 | 8/1962 | Oler . |
| 3,052,074 | 9/1962 | Dreeben . |
| 3,057,129 | 10/1962 | Meissner . |
| 3,063,211 | 11/1962 | Graves . |
| 3,063,845 | 11/1962 | Graves . |
| 3,071,907 | 1/1963 | Jarund ..................... 53/64 |
| 3,074,214 | 1/1963 | Schneider et al. . |
| 3,082,583 | 3/1963 | Larson et al. . |
| 3,090,175 | 5/1963 | Berglund . |
| 3,140,218 | 7/1964 | Hannon ..................... 156/583 |
| 3,147,168 | 9/1964 | Bateman . |
| 3,187,476 | 6/1965 | Anderson . |
| 3,192,684 | 7/1965 | Iannucci . |
| 3,221,469 | 12/1965 | Murray . |
| 3,228,170 | 1/1966 | Eisenstadt . |
| 3,229,442 | 1/1966 | Gram . |
| 3,236,021 | 2/1966 | Wagner et al. . |
| 3,274,746 | 9/1966 | James et al. . |

(List continued on next page.)

FOREIGN PATENT DOCUMENTS 149954 2/1953 Australia .
231906 2/1964 Austria .
509427 10/1952 Belgium .

(List continued on next page.)

*Primary Examiner*—Horace M. Culver
*Attorney, Agent, or Firm*—Robert M. Isackson

[57] ABSTRACT

Improved clamp, seal, sever, and brick apparatus for use in form, fill, and seal machines that form a polyfoil tube filled with a product into a plurality of sealed packages, preferably aseptic packages. The improved apparatus incorporates a plurality of sealing heads mounted on a continuously advancing structure that transversely clamps, seals, and severs the endlessly advancing tube into packages, and compresses the packages to preform them into about their final rectangular configuration.

Induction heating is used to seal the web. The sealing heads include a sealing jaw and an anvil jaw hinged together and adapted to clamp the tube therebetween at predetermined locations as the sealing heads and product filled tubing advance, the locations being adjustable and the sealing and anvil jaws being adjustable to control the volume of product clamped and sealed in each package.

36 Claims, 33 Drawing Sheets

U.S. PATENT DOCUMENTS

| | | |
|---|---|---|
| 3,300,944 | 1/1967 | Thesing . |
| 3,320,718 | 5/1967 | Thesing .................. 53/551 |
| 3,320,719 | 5/1967 | Murray .................. 53/551 |
| 3,320,720 | 5/1967 | Murray . |
| 3,320,721 | 5/1967 | Murray .................. 53/551 |
| 3,325,961 | 6/1967 | Lindh et al. . |
| 3,328,936 | 7/1967 | Billeb . |
| 3,332,198 | 7/1967 | Thesing . |
| 3,332,206 | 7/1967 | Murray . |
| 3,335,540 | 8/1967 | Reil et al. . |
| 3,344,576 | 10/1967 | Cloud et al. . |
| 3,353,328 | 11/1967 | Wheeler et al. . |
| 3,381,441 | 5/1968 | Condo, Jr. et al. . |
| 3,382,644 | 5/1968 | Vogt . |
| 3,388,525 | 6/1968 | Thesing et al. . |
| 3,388,526 | 6/1968 | Harm et al. . |
| 3,410,201 | 11/1968 | Swede . |
| 3,417,545 | 12/1968 | Ljungberg . |
| 3,417,674 | 12/1968 | Abrahamson . |
| 3,424,885 | 1/1969 | Garney et al. . |
| 3,426,499 | 2/1969 | Paige . |
| 3,426,885 | 1/1969 | Garney et al. . |
| 3,432,986 | 3/1969 | Schneider et al. . |
| 3,445,629 | 5/1969 | Stark et al. . |
| 3,449,888 | 6/1969 | Gausman . |
| 3,453,799 | 7/1969 | Cloud et al. . |
| 3,456,422 | 7/1969 | Doucette . |
| 3,457,132 | 7/1969 | Tuma et al. . |
| 3,461,014 | 8/1969 | James . |
| 3,464,181 | 9/1969 | Hechenleitner .................. 53/551 Z |
| 3,466,850 | 9/1969 | Hudson et al. . |
| 3,482,373 | 12/1969 | Morris . |
| 3,492,775 | 2/1970 | Rhine et al. . |
| 3,498,019 | 3/1970 | Rait . |
| 3,507,094 | 4/1970 | Coles . |
| 3,524,301 | 8/1970 | Zimmerman . |
| 3,530,642 | 9/1970 | Leimert . |
| 3,540,971 | 11/1970 | Johanski, Jr. .................. 156/566 |
| 3,543,467 | 12/1970 | Leasure . |
| 3,543,468 | 12/1970 | Leasure . |
| 3,546,835 | 12/1970 | Mobley . |
| 3,546,849 | 12/1970 | Zimmerman . |
| 3,552,087 | 1/1971 | Schneider et al. . |
| 3,566,575 | 3/1971 | Lisiecki . |
| 3,577,699 | 5/1971 | Silver . |
| 3,597,237 | 8/1971 | Nughes . |
| 3,597,898 | 8/1971 | Cloud . |
| 3,599,387 | 8/1971 | James . |
| 3,604,880 | 9/1971 | O'Neill . |
| 3,608,709 | 9/1971 | Pike . |
| 3,619,979 | 11/1971 | Martensson et al. . |
| 3,679,509 | 7/1972 | Fielibert . |
| 3,681,890 | 8/1972 | Pringle, Jr. et al. . |
| 3,681,892 | 8/1972 | Safranski . |
| 3,723,060 | 3/1973 | Lisiecki . |
| 3,738,080 | 6/1973 | Reil . |
| 3,738,892 | 6/1973 | Curcio . |
| 3,754,456 | 8/1973 | Andrews et al. . |
| 3,785,113 | 1/1974 | Martensson et al. . |
| 3,789,569 | 2/1974 | Egger . |
| 3,802,153 | 4/1974 | Dominici . |
| 3,812,644 | 5/1974 | Kamikawa et al. . |
| 3,821,873 | 7/1974 | Benner, Jr. et al. . |
| 3,849,965 | 11/1974 | Dominici . |
| 3,857,223 | 12/1974 | Dominici . |
| 3,864,186 | 2/1975 | Balla . |
| 3,866,394 | 2/1975 | Masai . |
| 3,874,976 | 4/1975 | MacFarland, Jr. . |
| 3,925,963 | 4/1975 | Greenawalt et al. . |
| 3,927,297 | 12/1975 | Reil . |
| 3,940,305 | 2/1976 | Stenberg . |
| 3,942,304 | 3/1976 | Hart et al. . |
| 3,943,683 | 3/1976 | Kovacs et al. . |
| 3,948,720 | 4/1976 | Reil . |
| 3,965,642 | 6/1976 | Hills et al. . |
| 3,973,474 | 8/1976 | Auckenthaler . |
| 3,982,374 | 9/1976 | Schaefer . |
| 3,992,851 | 11/1976 | James et al. . |
| 4,009,551 | 3/1977 | Greenawalt et al. . |
| 4,023,327 | 5/1977 | Simmons . |
| 4,034,537 | 7/1977 | Reil et al. . |
| 4,045,946 | 9/1977 | Schaefer . |
| 4,077,186 | 3/1978 | Voegele . |
| 4,118,913 | 10/1978 | Putnam, Jr. et al. . |
| 4,128,985 | 12/1978 | Simmons . |
| 4,133,162 | 1/1979 | Baumstingl . |
| 4,136,505 | 1/1979 | Putnam, Jr. et al. . |
| 4,144,693 | 3/1979 | Oqata . |
| 4,199,919 | 4/1980 | Moscatelli . |
| 4,249,364 | 2/1981 | Kawasaki et al. . |
| 4,299,075 | 11/1981 | Gram . |
| 4,305,240 | 12/1981 | Grevich et al. . |
| 4,316,566 | 2/1982 | Arleth et al. . |
| 4,322,929 | 4/1982 | Neumann . |
| 4,346,545 | 8/1982 | Crescenzo et al. . |
| 4,353,196 | 10/1982 | Beer et al. . |
| 4,380,446 | 4/1983 | Dickson et al. . |
| 4,384,438 | 5/1983 | Hilmersson . |
| 4,387,547 | 6/1983 | Reil . |

(List continued on next page.)

OTHER PUBLICATIONS

| | | |
|---|---|---|
| 4,391,081 | 7/1983 | Kovacs . |
| 4,448,010 | 5/1984 | Stohlquist et al. . |
| 4,450,669 | 5/1984 | Rapparini ................................ 53/551 |
| 4,495,745 | 1/1985 | Crescenzo et al. . |
| 4,580,392 | 8/1986 | Lagerstedt et al. . |
| 4,614,078 | 9/1986 | Kawabe ................................ 53/551 |
| 4,637,199 | 1/1987 | Steck et al. ........................ 53/551 X |
| 4,663,916 | 5/1987 | Ohlsson ................................ 53/551 |

FOREIGN PATENT DOCUMENTS

| | | |
|---|---|---|
| 921565 | 2/1973 | Canada . |
| 594677 | 3/1934 | Fed. Rep. of Germany . |
| 1104422 | 4/1961 | Fed. Rep. of Germany . |
| 1124865 | 3/1962 | Fed. Rep. of Germany . |
| 1146431 | 3/1963 | Fed. Rep. of Germany . |
| 1218332 | 6/1966 | Fed. Rep. of Germany . |
| 1247192 | 8/1967 | Fed. Rep. of Germany . |
| 278660 | 2/1970 | Fed. Rep. of Germany . |
| 2014974 | 11/1970 | Fed. Rep. of Germany . |
| 293280 | 9/1971 | Fed. Rep. of Germany . |
| 2131906 | 1/1972 | Fed. Rep. of Germany . |
| 2337939 | 2/1975 | Fed. Rep. of Germany . |
| 2410101 | 9/1975 | Fed. Rep. of Germany . |
| 2515849 | 10/1975 | Fed. Rep. of Germany . |
| 197077 | 8/1980 | Fed. Rep. of Germany . |
| 1120756 | 7/1956 | France . |
| 1247747 | 10/1960 | France . |
| 1368859 | 6/1964 | France . |
| 2217218 | 9/1974 | France . |
| 2227178 | 11/1974 | France . |
| 269069 | 10/1970 | U.S.S.R. . |
| 861079 | 2/1961 | United Kingdom . |

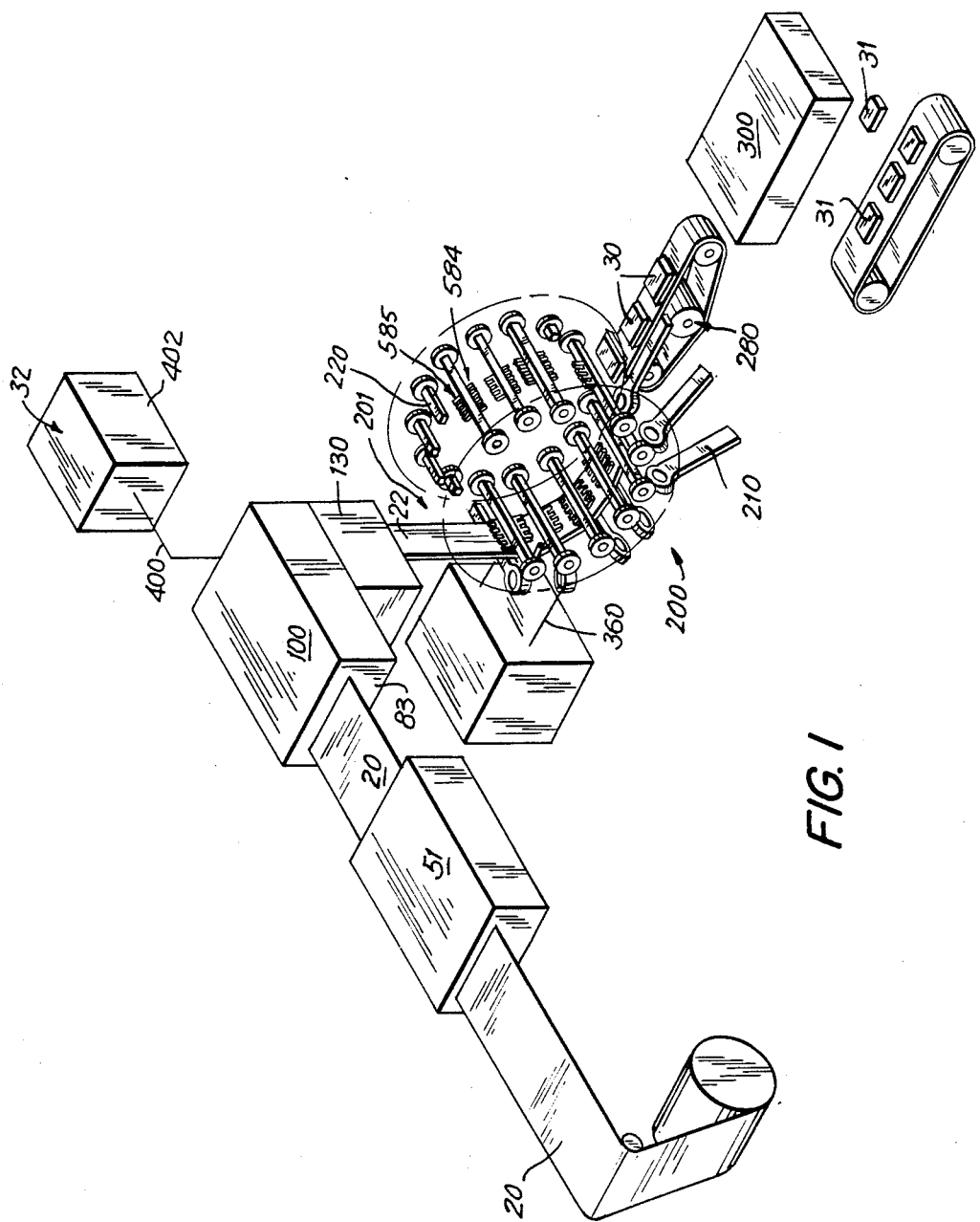
FIG. I

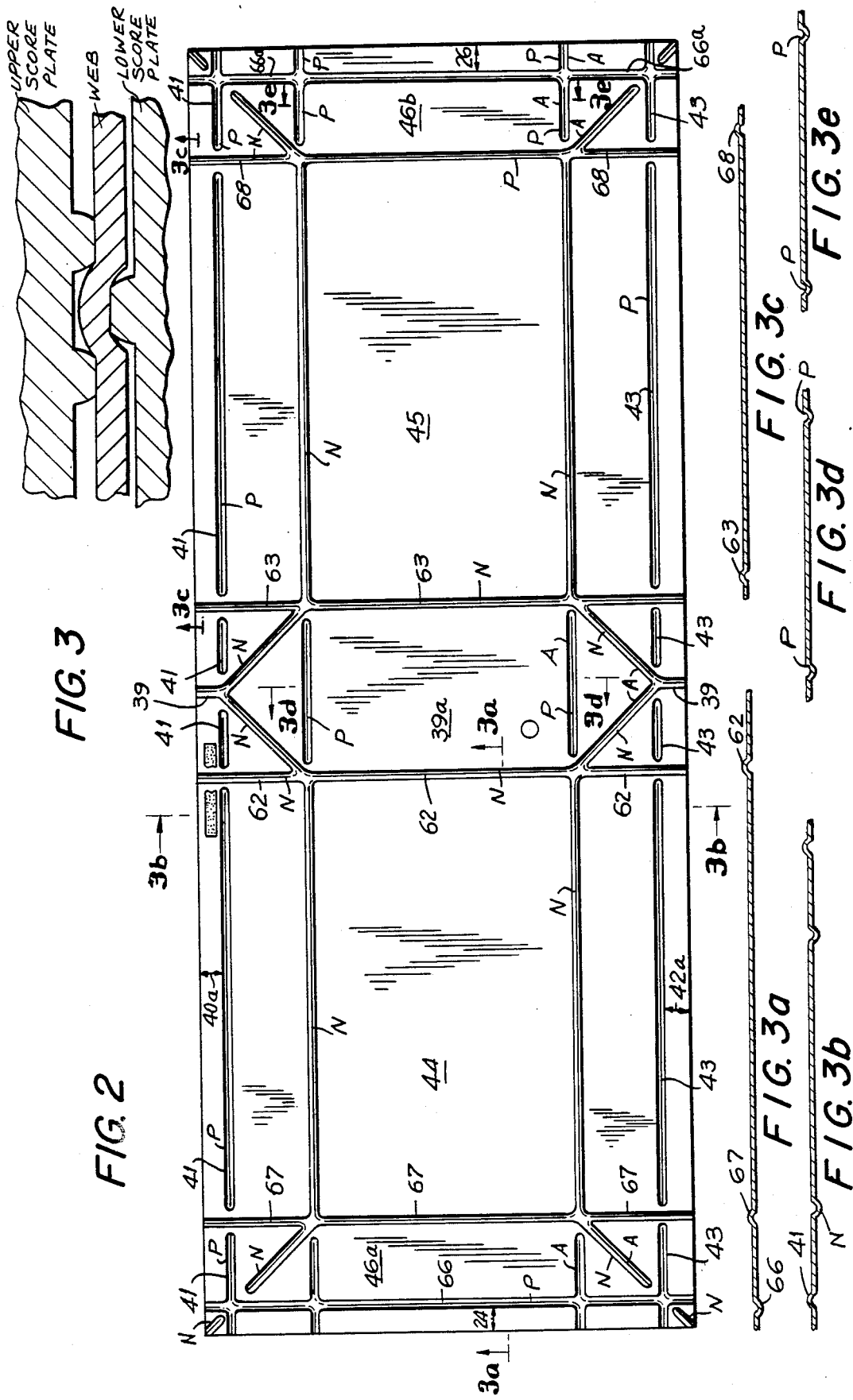

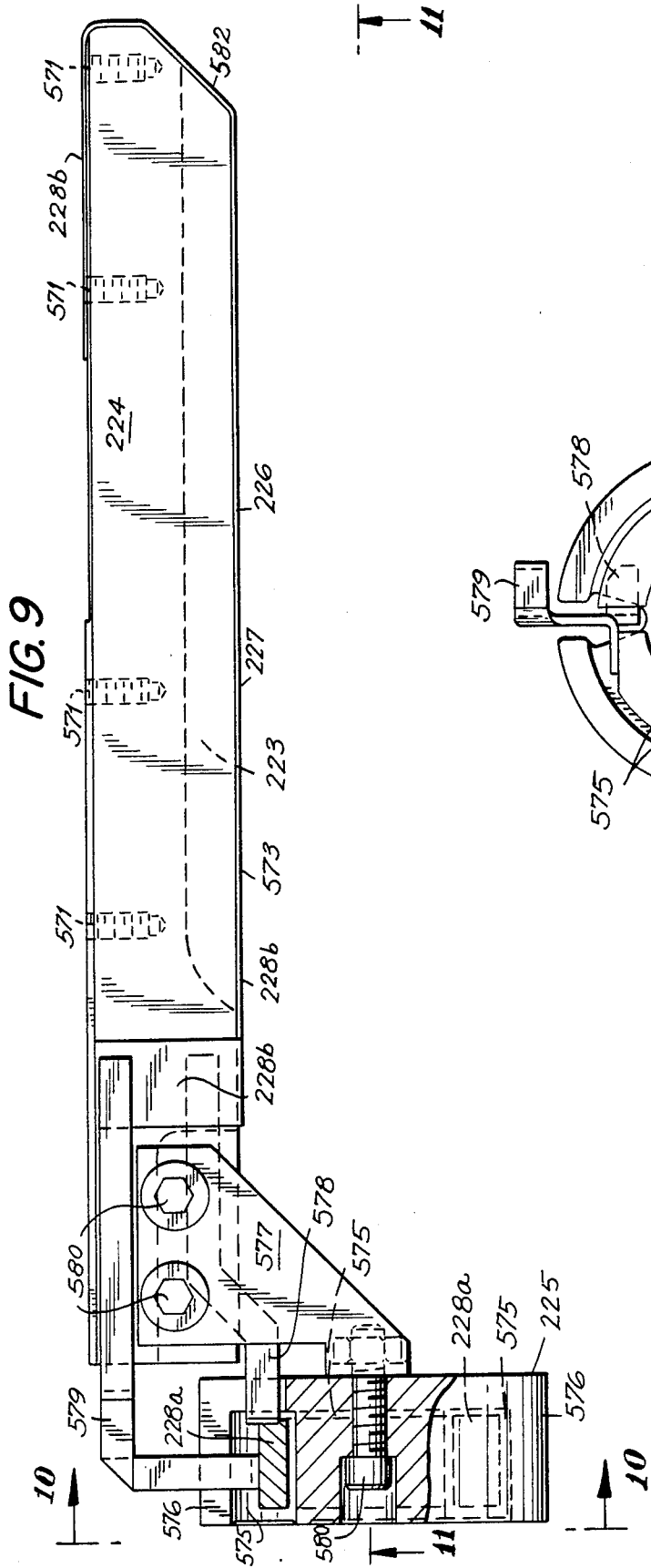
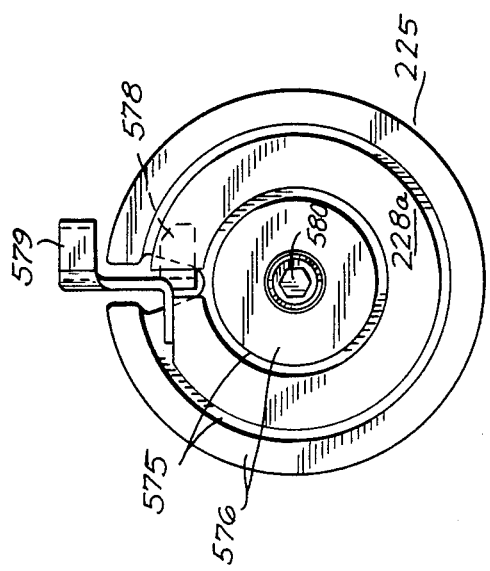
FIG. 9
FIG. 10

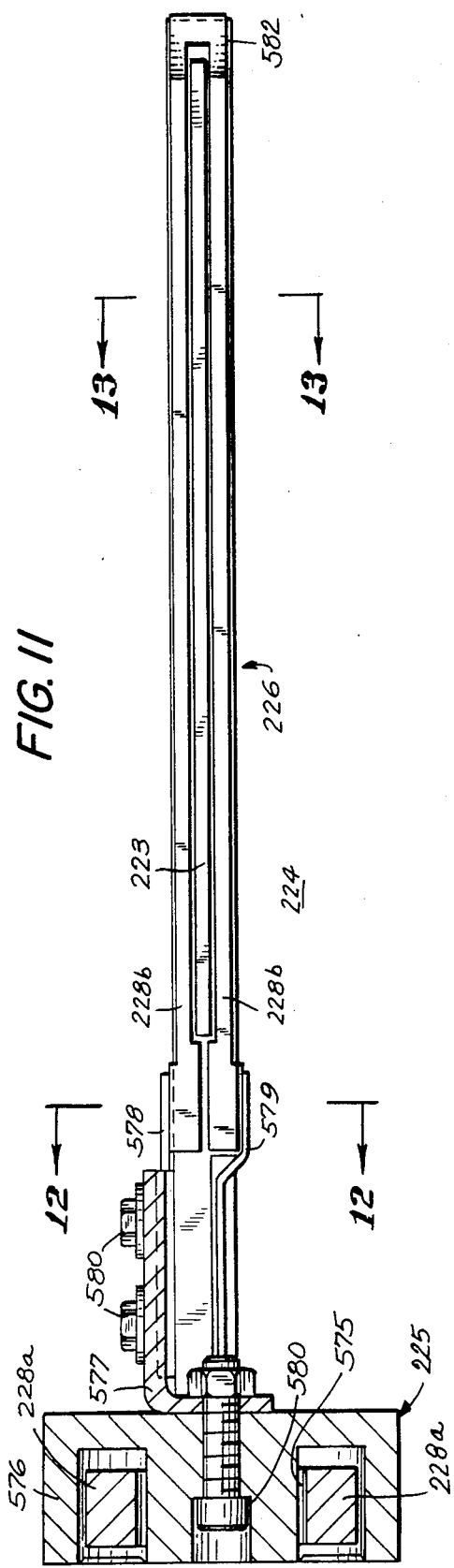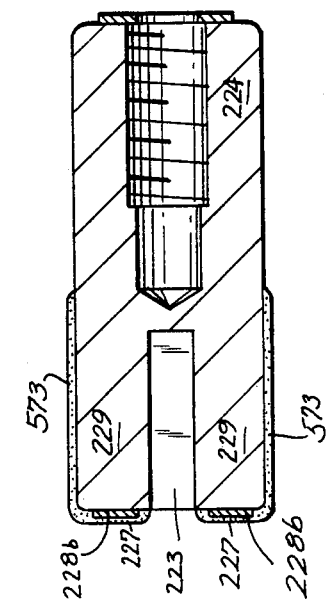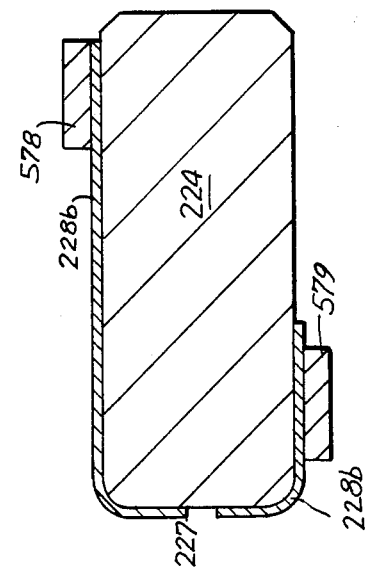

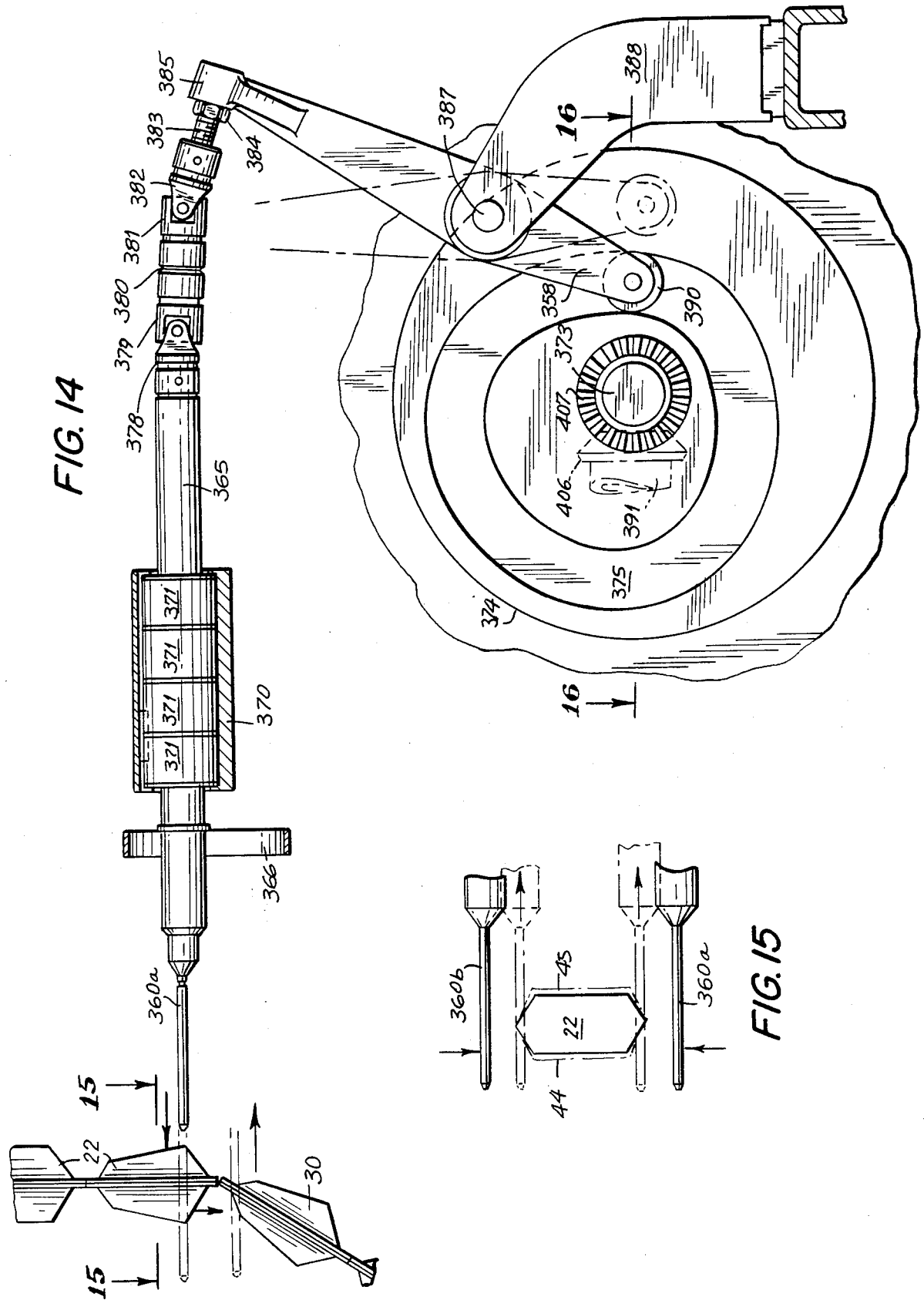

HIGH CAPACITY PACKAGE SEAL, SEVER, AND BRICK APPARATUS AND METHOD

This invention relates to a method and machine for forming an advancing tube filled with a product into packages at high rates of production, particularly to an improved method and apparatus for clamping, sealing, severing, and bricking a web of polyfoil material into aseptic packages containing a product.

BACKGROUND OF THE INVENTION

Aseptic packages refer to sealed containers containing a substantially uniform predetermined amount of a product made in accordance with commercial aseptic packaging standards. Commercial aseptic packaging involves introducing a sterile product into a sterile container and then hermetically sealing the container in an environment substantially free of microorganisms capable of growing in a shelf stable product at temperatures at which the cooled finished product is likely to be stored during distribution and storage prior to consumption. Hermetically sealed containers minimize the transmission of any gas or fluid through the container package so that there is substantially no biological transmission. Preferably the package is also substantially free of air which, if present in significant amounts, could promote undesired microbial growth or, even in the absence of microbial growth, adversely affect the taste or color of a product. Typical products are fluent materials, specifically, a fluid drink such as milk, fruit juices, and the like.

The sterile containers commonly comprise a laminated web packaging material preferably having at least one layer of current carrying material such as aluminum foil, an exterior layer of thermoplastic material to become the package interior in contact with the product, and an exterior layer of material for contact with the environment. The laminated material, also referred to herein as "polyfoil web", is typically strong enough to stand upright in a somewhat rigid finished configuration to contain the product for shipping and storage, and also commonly includes a conventional paperboard structural layer. Product labeling and registration marks and the like may be printed on the paperboard layer or the outer thermoplastic layer. In the most preferred embodiment of the invention described below, the polyfoil web to be used comprises a laminate of, in order, a layer of low density polyethylene, paper stock, Surlyn ®, aluminum foil, Surlyn ®, and linear low density polyethylene. The low density polyethylene layer could also be a high density polyethylene, and the linear low density polyethylene layer could be a low density polyethylene.

The thermoplastic material forming the package interior must be capable of being sealed together to form hermetic seals. Typically, opposing thermoplastic layers are heated to a melting temperature so that they will fuse together. The thermoplastic and metallic foil layers act in concert to provide the hermetic barrier for the aseptic package. The metallic foil layer provides a light and oxygen barrier. The outer layer is commonly a thermoplastic material that can be heated so that the package seams and triangular tabs of excess material formed during final forming or bricking of the packages can be fused or tacked to the package sidewalls to form an aesthetically pleasing package.

Such polyfoil laminates may include spaced access means to enable the user to readily extract the product from the finished package.

Several methods and machines for forming aseptic and non aseptic packages or cartons from paper stock and laminated web materials are known. These methods and machines generally fall into two categories, blank fed and web fed.

In blank fed machines, the supply of web first is separately formed into cut and scored blanks. The blanks are then fed into the forming section of the machine one at a time and erected into containers. Many machines operate on several blanks at different stages of construction at a time. For aseptic packaging, the containers are sterilized, filled with a sterile product, and hermetically sealed close while in a sterile environment.

Some blank fed machines form the blanks into cartons intermittently, performing one assembly operation on the blank or carton at each station and advancing the blank or carton from station to station. Other blank fed machines operate semi-continuously by continuously advancing the blank to form the container and then intermittently advancing the container to sterilize, fill, and seal the container. One commercial intermittent type blank fed aseptic machine is Combiblok, Model No. CF 606A.

In web fed machines, the web is taken directly off the roll of web stock, scored (unless prescored on the roll) and fed into the machine. The machine then folds the web to form a column, seals the longitudinal edge to form a tube, fills the tube with a product, and clamps, seals, and severs the tube to form the packages. The web advance may be continuous, to gradually manipulate the web into sealed packages, or intermittent, to perform each assembly operation while the web is stationary or while the web is moving between stations.

For aseptic packaging, the web is sterilized and fed into a sterile machine section, so that the tube is sterile and the package is formed, filled and sealed in a sterile environment. One commercial automatic continuous feed aseptic machine is Tetra-Pak Model AB 9. Other known aseptic machines include International Paper Co.'s, web fed aseptic package machine, Model SA.

In many of the machines, reciprocating means are used to operate on the web either when the web or package is stationary, reciprocating into position and operation and then reciprocating out of position and operation when the web or package is advanced, or when the package advances, reciprocating with and operating on the package as it moves and then returning to the beginning of its stroke range while the web or package is stationary to operate on the following package.

The web fed machines may have one or more reciprocating means which reciprocate while the web continues to advance or opposing endlessly rotating means such as wheels or endless linked belts containing a plurality of identical means for sequentially operating on the web as the web advances at a substantially uniform speed. The present invention relates to an improvement in web fed type machines, and is designed to have a production rate substantially higher than that of presently known machines.

The primary problem with the aforementioned forming, filling, and sealing machines is that they are limited in the machine speed and web control required to make aseptic packages at a rate of speed higher than presently obtainable in an economically efficient manner. The production rate of known blank fed designs and machines are limited by the time required to erect a blank into a carton, fill the carton, and seal it. Intermittent and continuous web fed machines are limited by the rate at which the sealing mechanisms can clamp, seal, and sever the tube into packages or by the speed of the endlessly advancing linked chains or belts or rotating wheel on which the sealing mechanisms are mounted, or by the rate of reciprocating action of the sealing means to form each package.

Increasing the speed of continuous web fed machines can cause opposing wheels or belts to oscillate or bounce as the sealing mechanisms come in contact with each other to clamp and seal the package. This increases wear and decreases the useful life of the sealing mechanisms and could cause the wheels or belts to vibrate or become misaligned or untracked so that the sealing mechanisms would not seal accurately. Increasing machine speed is also limited by the dwell time required for clamping, heating, and cooling the web to form heremetic seals.

Similarly, increasing the frequency of reciprocation of the sealing means or other elements to increase the rate of production would also increase the wear and exaggerate any imbalance which could cause such an apparatus to shake itself apart. Adding a second reciprocating device sealing head to increase the rate has been applied with some success, see, for example, Model AB-9 manufactured by Tetra-Pak. However, this technique also suffers from having a limited maximum reciprocation and production rates and adds undue mechanical complexity to permit the plural means to reciprocate past each other without interference.

Adding a second or multiple production lines does not solve the problem of increasing the production rate of a single machine. Multiple production lines mounted on a single frame may achieve some efficiencies in sharing common elements, but it is effectively the same as two or multiple machines. The rate of production is not increased, only the volume. Such machines, e.g, the aforementioned Combiblok machine which has two parallel production lines, and other known models which have four production lines, are unduly bulky, mechanically complicated, and occupy a substantial amount of floor space. Further, the more common elements shared by the multiple lines, the more complicated and expensive the machine becomes, especially if the entire machine must be stopped to fix a problem present in only one of the lines.

A problem with using fixed wheels and opposed endless linked belts is that the structure required to maintain the sealing mechanisms spaced apart has no reliable means for altering the spacing between the sealing mechanisms to aid in preforming the package into a rectangular configuration. This typically requires the use of additional forming means. Further, for linked chains or belts, there are inherent timing and orientation problems in aligning the opposing sealing and severing means on opposite sides of the web given the mechanical flex inherent in moving linked chains or belts. The vibrations in the belts as they advance may result in misalignment, imperfect seals, and may cause the severing knife to contact and damage the opposing sealing head.

It is therefore an object of this invention to provide a form, fill, and seal machine with a single relatively slowly rotating structure having a plurality of sealing mechanisms for clamping, sealing, severing, and bricking a continuously advancing web of polyfoil material formed into a tube and filled with a fluent product into a plurality of packages.

It is another object of this invention to provide a volume control means to fix the volume of the tube as it is transversely clamped so that each package contains substantially the same quantity of product.

It is another object to adjust the orientation of the sealing mechanisms as they transversely clamp the tube to aid in controlling the volume of product in each package.

It is another object to selectively adjust the angular orientation of the sealing mechanisms on the structure so that adjacent sealing mechanisms move relative to one another to form the packages into about what will be their final bricked form.

It is a further object to maintain the web transversely clamped for a period of time sufficient to form hermetic seals, without over-stressing the mechanical limitations of the apparatus at high rates of production.

SUMMARY OF THE INVENTION

In order to overcome the problems and inherent limitations of traditional aseptic form, fill, and seal machines, the present invention provides improved methods and apparatus for clamping a continuously advancing tube of polyfoil material filled with a product, controlling the volume of product in the tube as it is transversely clamped, sealing the tube transversely, severing the tube transversely, and forming the severed and sealed tube section into about its finished bricked configuration for a period of time, without giving the package its final shape, thereby preforming the package.

In the preferred embodiment, the method and machine are adapted for making aseptic packages formed from a continuous web of laminated material during continuously advancing operation, under microprocessor control.

The present invention provides a plurality of sealing mechanisms mounted on and evenly spaced about a rotating structure for clamping, sealing, severing, and preforming packages from the advancing product filled tube. Each sealing mechanism includes a sealing jaw and an anvil jaw pivotally connected together with the jaws being rotatably mounted in the rotating structure. A means for opening and closing the jaws at predetermined points along the path of travel of the structure as it rotates is provided. The closing of the jaws effects transverse clamping of the polyfoil tube filled with product. Such clamping compresses the tube and forces the product out from between the opposing inner layers of the polyfoil web.

Immediately before the tube is transversely clamped, the configuration of the tube is adjusted by a volume control means so that the volume of product in the tube to be clamped off is substantially uniform from one package to the next. With continued rotation of the structure, the clamped tube is segmentally bent to travel about the periphery of the structure.

The volume control means preferably comprises a device to guide the advancing clamped edge of the tube and hold it securely, opposing structures disposed about the tube which can be moved into position to establish boundaries against which the product filled tube can expand, and contacting members which compress the tube to aid in controlling the tube configuration and, hence, the volume of product in the tube.

Each sealing jaw contains a sealing means for sealing the polyfoil tube transversely. Preferably, the sealing means is an induction heating coil, disposed in the clamped area transverse to the web, which can be energized for a period of time to induce a current of appropriate density in the current carrying layer of the transversely clamped section of web proximate to the coil. The induced current heats the current carrying layers resistively, and the inner facing thermoplastic layers conductively, to cause the thermoplastic to melt, fuse together, and cool into a hermetic seal after the induced current is stopped, while the sealing mechanism is clamped under pressure about the web.

In the preferred embodiment, the induction coil is a secondary induction coil and energizing the secondary induction coil in the sealing jaw involves moving the coil into proximity with a stationary work coil that is directly connected to a conventional radio-frequency generator, as the sealing mechanism rotates with the rotating structure. When the transverse coil is in the effective range of the energized work coil, it will inductively couple thereto and be energized for the period of time it is coupled, while the work coil is energized, at a predetermined power level. The induction coil in turn induces a current in the polyfoil material sufficient to seal the web transversely. Radio frequency current permits using thin current carrying coil conductors because the well known skin depth phenomenon, at radio frequencies, causes the current flowing in the conductor to be concentrated in a relatively thin cross sectional area at the conductor surface.

As the structure continues to rotate, the secondary induction coil will rotate out of the effective range of the field generated by the work coil, effectively decoupling the sealing jaw coil from the r-f generator. The energization times may range from continuous energization at one or more power levels to very short energy bursts or pulses of energy at the same or different power levels, depending upon the web, the coil design, the coupling between the work coil and the secondary sealing jaw coils, the rate of speed of the web, and the power rating of the r-f generator used.

Other sealing means could be provided such as sonic welding, dielectric or thermal welding and the like.

Means for controlling and changing the orientation of adjacent sealing mechanisms while clamped to the sealed web are provided so that the leading sealing mechanism, which may be normally biased in an advanced position relative to a position perpendicular to the surface of the structure, is rotated to a retarded position while the trailing sealing mechanism is in an advanced orientation so that they are urged toward each other to compress the package clamped between the adjacent mechanisms against a series of flanges to form or brick the package into what will be substantially its ultimate, preferably rectangular, configuration. Then, the lead sealing mechanism can be opened and returned to its normal position and the trailing mechanism retarded to compress and brick the following package. In an alternate embodiment, the leading sealing mechanism may be retarded as the trailing mechanism is advanced, relative to normal perpendicular position, to compress and brick the package. During this bricking operation, the volume control boundaries retract or are moved so as not to interfere with the bricking flanges.

A severing means in the sealing mechanism is actuated through the transversely clamped area to sever the package from the tube, either before, during or after the bricking activity The end result is a preformed package which may be further processed into its ultimate final configuration.

In the preferred embodiment, the rotating structure is a cylindrical wheel. The means for opening and closing the jaws is a first cam lever arm system, and the means for adjusting the orientation of the sealing means is a second cam lever arm system. For the volume control means, the guide means is the leading sealing mechanism clamped about the tube and advancing the tube about the periphery of the cross seal wheel, one boundary is an extendable retractable plate mounted in the anvil jaw of the following sealing mechanism which is about to be closed, and the other boundary is a plurality of fingers projecting from the leading sealing jaw. The contacting members are oscillating fingers that contact the tube as the tube advances past a stationary work station. The transverse induction coil is preferably mounted in the sealing jaw, and the severing means is preferably an extendable retractable knife mounted in the anvil jaw. Movement of the knife is controlled by biasing springs and a third cam. After the bricking and severing steps, the sealing and anvil jaws are separated and the preformed package may be taken from the rotating wheel to further package forming and handling operations. The plurality of sealing mechanisms thus form a plurality of preformed packages as the wheel rotates.

The present invention is particularly useful in machines for forming aseptic packages where a polyfoil web is sterilized, the web is formed into a continuously advancing tube by folding the web and longitudinally sealing the opposing web edges together, the tube is filled with a cool sterile product and then transversely clamped, sealed, severed, and bricked using the plurality of sealing mechanisms of the present invention to preform the sealed package into what will be its final shape and the preformed aseptic package is squared into a rectangular shape by bricking, and the excess polyfoil packaging material is flattened or tacked against the packages panels to form a finished aseptic package.

In the preferred embodiment, the polyfoil web is taken off a supply roll and scored or prescored with a pattern of score lines corresponding to the folds the web will make to form a finished package so that the bricking causes the polyfoil tube to fold at the desired location for each package.

It is to be understood that while the present invention is discussed in the context of producing quarter-liter aseptic packages, one skilled in the art could use the methods and apparatus in other areas including, but not limited to, packages of different sizes and shapes, non-aseptic packages, packages that must be kept refrigerated and packages containing fluent particles. Therefore, the foregoing and following description is to be viewed as illustrative and not in a limiting sense.

BRIEF DESCRIPTION OF THE DRAWINGS

FIG. 1 is an elevated perspective view of an aseptic package forming, filling, sealing, and bricking machine in accordance with the present invention.

FIG. 2 is a top sectional view of a polyfoil web corresponding to one package, after scoring, for use in accordance with the present invention.

FIG. 3 is a cross-sectional view of a conventional scoring unit for the web of FIG. 2.

FIGS. 3a–3e are cross-sectional views of FIG. 2 taken across respective lines 3a—3a, 3b—3b, 3c—3c, 3d—3d, and 3e—3e.

FIG. 9 is a top view of the transverse induction coil of the sealing jaw of FIG. 5.

FIG. 10 is an end view of FIG. 9 taken along line 10—10.

FIG. 11 is a face sectional view of FIG. 10 taken along line 11—11.

FIG. 12 is an end sectional view of FIG. 11 taken along line 12—12.

FIG. 13 is an end sectional view of FIG. 11 taken along line 13—13.

FIG. 14 is a side view of the volume control assembly in accordance with the present invention.

FIG. 15 is a top sectional view of FIG. 14 taken along line 15—15.

DETAILED DESCRIPTION OF THE INVENTION

Figure 21:
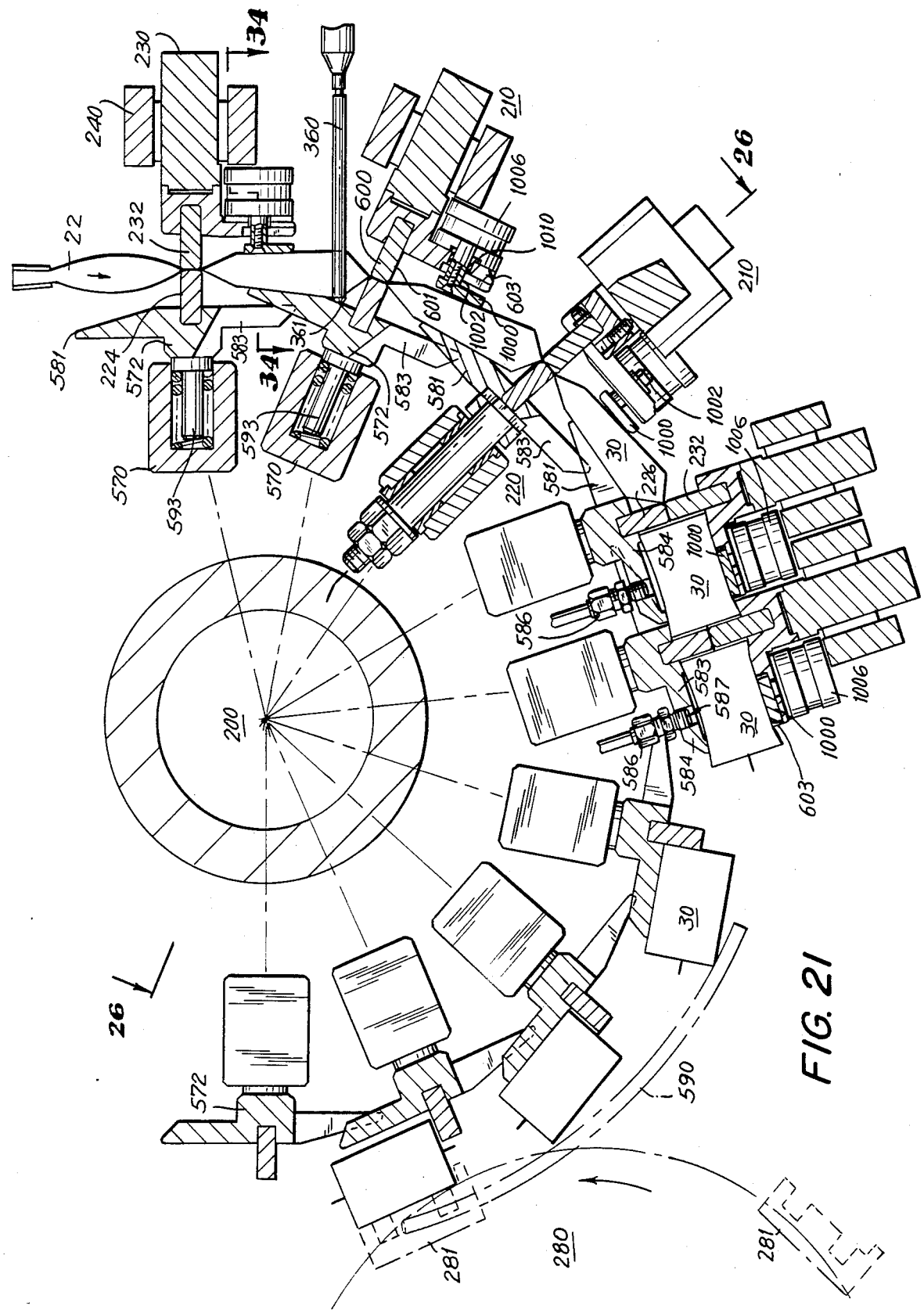
FIG. 21 is a side cross-sectional view of the cross seal wheel in accordance with the present invention.
Figure 23:
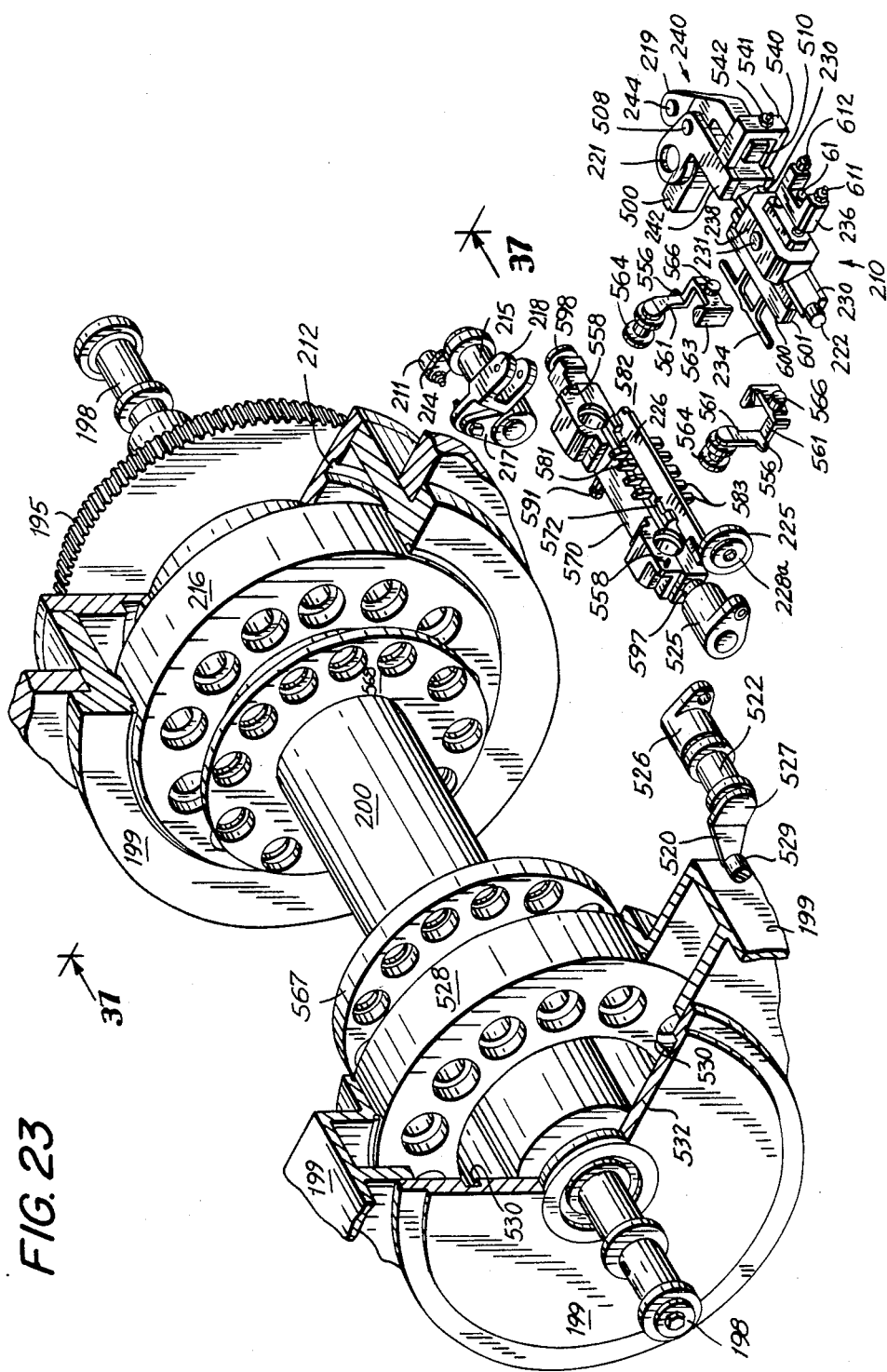
FIG. 23 is a partial exploded elevated perspective view of FIG. 21.
Figure 24:
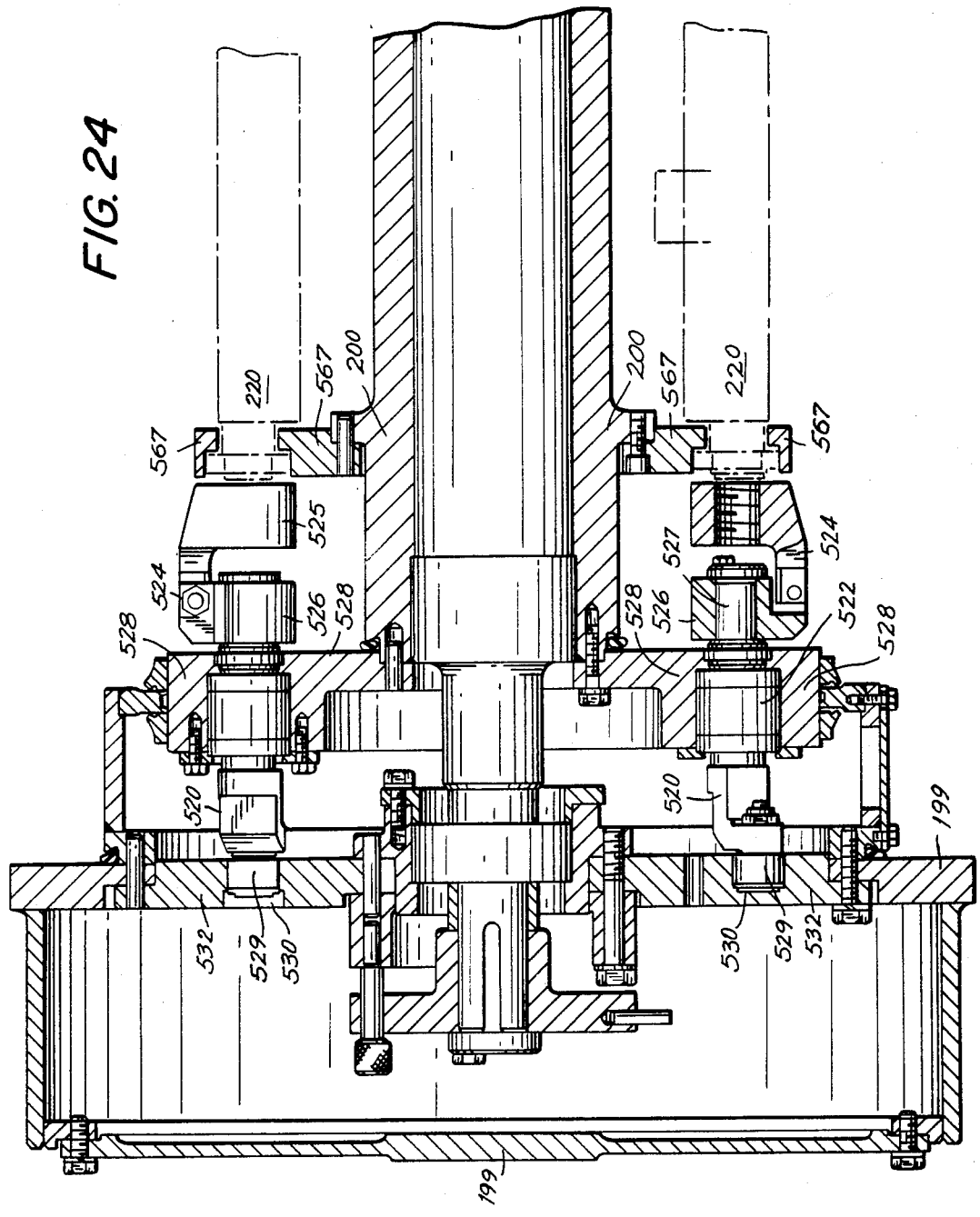
FIG. 24 is a partial front cross-sectional view of FIG. 23 taken through the longitudinal axis.

As shown in FIGS. 1, 21, and 23, an illustrative embodiment of this invention is useful in connection with form, fill, seal, and brick machine 10, which may be a microprocessor controlled apparatus that produces finished polyfoil packages 31 filled with product 32 by passing polyfoil web 20 through scoring area 51 (if web 20 is not prescored), passing scored web 20 into a cleaned and preferably presterilized area 100 to sterilize web 20, forming web 20 into polyfoil tube 22 in vertical seal area 130, filling tube 22 with product 32, passing filled tube 22 into rotating cross seal wheel 200 to transversely clamp, seal, sever, and brick tube 22 into discrete preformed packages 30 which may be subsequently formed into finished containers 31 for packaging and shipping by forming apparatus 300. The apparatus may be intermittently or, preferably, continuously driven in a controlled fashion as known to those of skill in the art.

As shown in FIGS. 2 and 3, scoring unit 51 imprints conventionally a pattern of positive and negative and vertical, horizontal and 45° score lines into web 20 to facilitate package forming and bricking into final form, e.g., rectangular package 31 (see FIG. 1). In the preferred embodiment, positive score lines P and negative scorelines N (or male and female respectively), relative to the foil side view, facilitate proper and uniform folding of the web according to which way the web is scored. A male score will cause the two adjacent panels to form an angle with the scoreline at the base. The directions of folding are indicated by the arrows shown in FIG. 3. The male and female score lines do no intersect. This prevents unduly stretching, tearing or delaminating web 20, prevents product leakage at intersecting package panels, and permits forming a substantially rectangular package having a substantially flat bottom.

Web 20 enters sterilization area 100 where it is cleaned (if necessary) and at least the product contacting side of the polyfoil web is sterilized. The web is maintained sterile at least until after the product containing package is transversely and hermetically sealed. Product 32 is taken from supply 402 e.g. a conventional sterile product processor or storage tank, and introduced into continuously forming tube 22 by filler tube 400 which terminates well below the product level to minimize the amount of air introduced into product 32.

In accordance with the preferred embodiment, there is always enough product in the tube for several packages. The instantaneous product level may be detected by the microprocessor and the rate of fill controlled, for example, by a throttling valve, to keep the product level within a defined working range, taking into account surging of the product level within the working range as package are formed and severed at the end of advancing tube 22. The microprocessor may shut down machine 10 when predetermined overflow or underflow limits are exceeded.

Sterile air is typically injected inside tube 22 above the product to maintain aseptic sterility of the product and the product filled tube before the tube is sealed transversely.

After web 20 is sterilized, it is fed into tube forming section 130 where it is sealed together to form tube 22. Preferably, web 20 is folded longitudinally with the web edges in opposition, inside thermoplastic layer to inside thermoplastic layer, and filled with product 32. Preferably, longitudinal sealing is by induction heating, fusing hermetically the thermoplastic layers together; but alternative sealing means could be used, e.g., heat, sonic, dielectric or thermal welding or the like. Alternate constructions of tube 22 could include sealing the web edges inside to outside in an overlapping fashion, or sealing together multiple pieces of web or using spirally wound web to form the tube.

Referring to FIGS. 1 and 21-25, the transverse tube clamping, sealing, and severing operation of the present invention is shown. Tube 22, filled with product 32, advances downwardly and approaches the beginning of the seal area at location 201. Cross seal wheel 200 inside housing 199 of machine 10 contains a plurality of clamping and sealing mechanisms secured to flanges extending from wheel 200. Cross seal wheel 200 is adapted for rotating relative to housing 199, preferably under the control of the microprocessor, from a drive source (not shown) affixed to the end of spindle 198. Spindle 198 is aligned with the axis of revolution of cross seal wheel 200 and drives cross seal wheel 200.

In the preferred embodiment there are fifteen sealing mechanisms for making fifteen transverse seals for fifteen complete packages per revolution, but this number could be changed with corresponding machine design changes to accommodate more or fewer sealing mechanisms and packages per cross seal wheel revolution. Similarly, the cross seal wheel and sealing mechanisms dimensions could be modified to correspond to a particular size package.

Referring to FIGS. 21, 22, 23, and 25, each sealing mechanism includes sealing jaw 220 which is rotatably aligned with the central axis of cross seal wheel 200, and anvil jaw 210 which at one end is pivotably connected to cross seal wheel 200 and sealing jaw 220 by compression spring hinge apparatus 240. The angular orientation of the sealing mechanism can be adjusted, as described below, by adjusting the relative rotation of each sealing jaw about its axis.

Figure 27A:
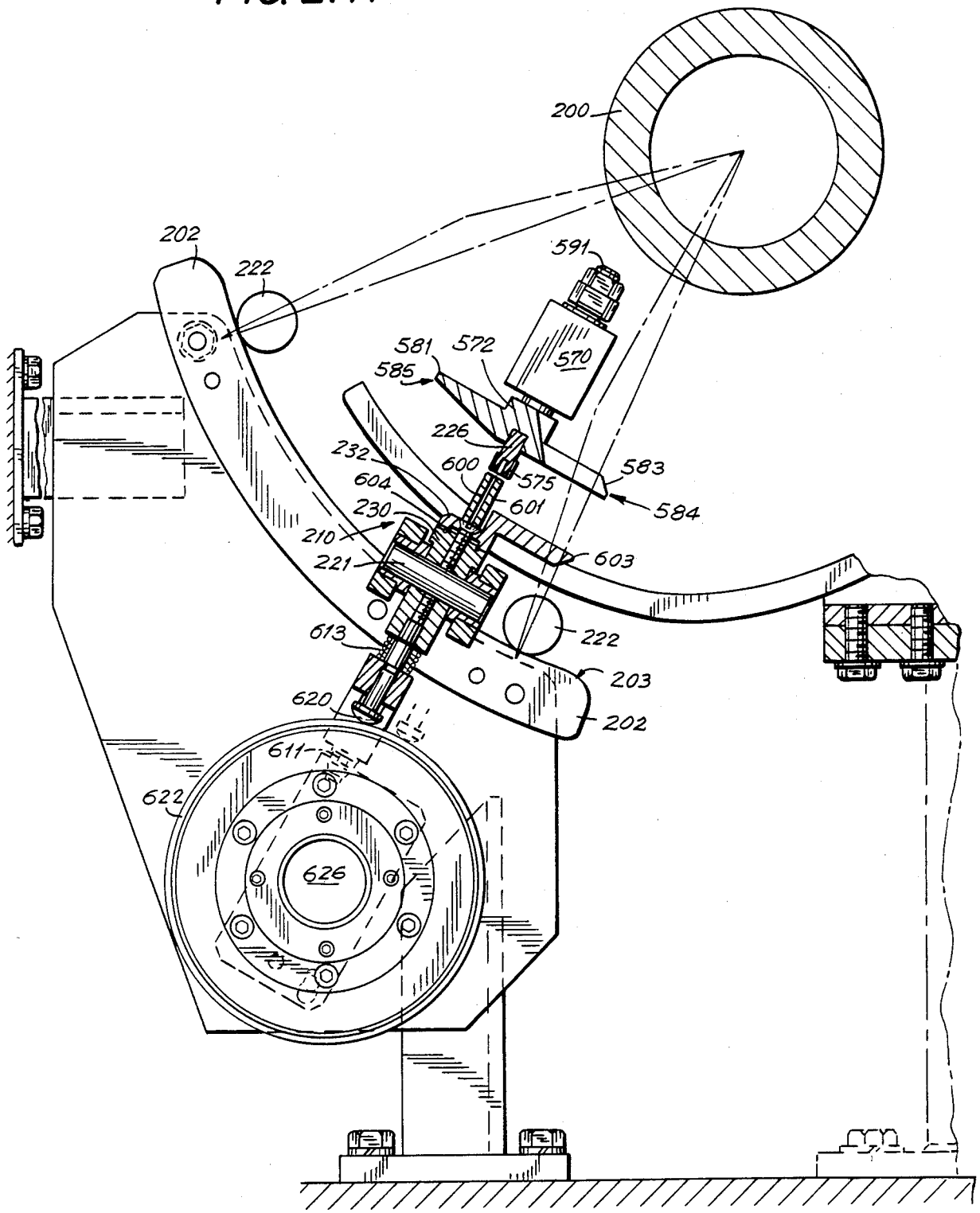
FIGS. 27a and 27b are side sectional views of FIG. 26 taken along line 27—27.
Figure 27B:
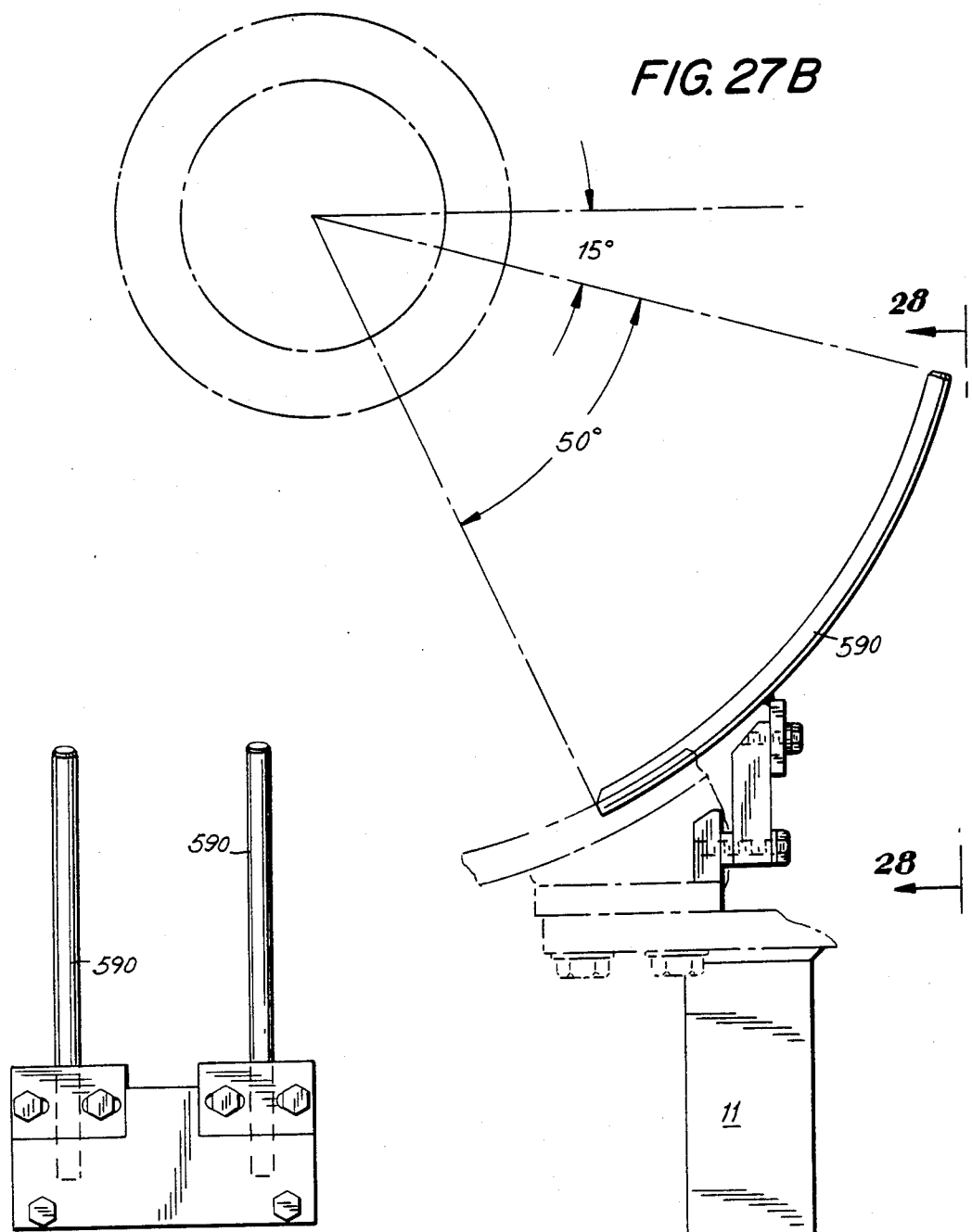
Figure 28:
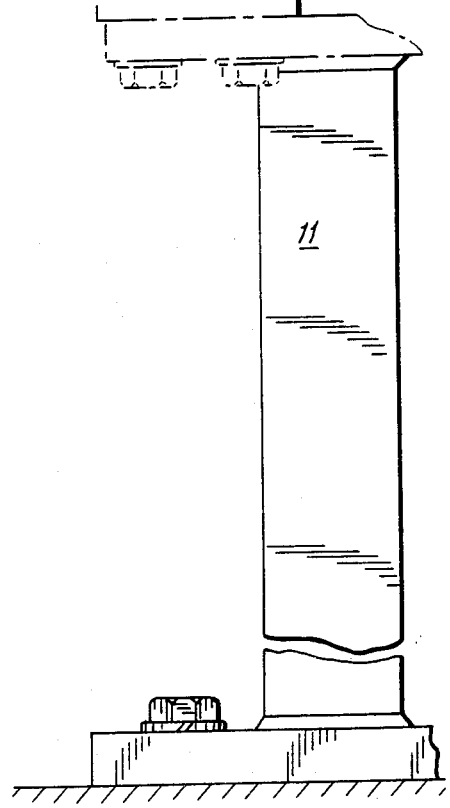
FIG. 28 is a front view of FIG. 27b taken along lines 28—28.

Apparatus 240 controls movement of anvil arm 210 between its fully open position and fully closed position relative to sealing jaw 220. In the open position, anvil jaw 210 extends from cross seal wheel 200 at an angle of about 70°, as shown in FIG. 1. The angle must be sufficient for the arm to clear machine 10 apparatus as the arm swings about its path. In the closed position, anvil jaw 210 is held parallel to sealing jaw 220 and retained in place either by compression spring hinge apparatus 240 alone, or preferably in combination with other means, for example, high pressure cam track 202, mounted on frame 11. Cam track 202 is adapted for urging cam follower 222 towards sealing jaw 220 to provide an additional high pressure clamping force (see FIGS. 22, 27a). Cam follower 222 is mounted for rotation on the unhinged end of anvil jaw 210 and is adapted for travel along and inside surface 203 of track 202. High pressure cam track 202 extends for a distance along an arc-length of about 58 degrees about and spaced from the axis of cross seal wheel 200 along the transverse clamping, sealing, and severing area.

During operation, a location on tube 22 is transversely clamped between anvil jaw 210 and sealing jaw 220 for the clamping, sealing, and severing operation as anvil jaw 210 is closed. The transverse sealing area is defined, with reference to FIG. 2, as comprising panels 40a and 42a, respectively above and below scorelines 41 and 43, and the opposing areas when web 20 is folded about score lines 39 (but preferably not folding panel 39a) during transverse clamping. The force exerted on tube 22 by the sealing mechanism must be sufficient to flatten tube 22 so that substantially all the product is removed from the transverse area to be sealed and the inner thermoplastic layers of tube 22 are in contact for fusion when heated as described below. The pressure is typically about several hundred psi and is controlled by compression springs and close mechanical tolerances which accommodate clamping and other motion as cross seal wheel 200 rotates. This ensures an adequate seal and also maintain sufficient pressure to permit passing a cut off knife through the web without dragging any polyfoil through. The spring pressure will tolerate a moderate amount of wear and permit satisfactory operation until visual inspection reveals replacement or adjustment is required.

Figure 29:
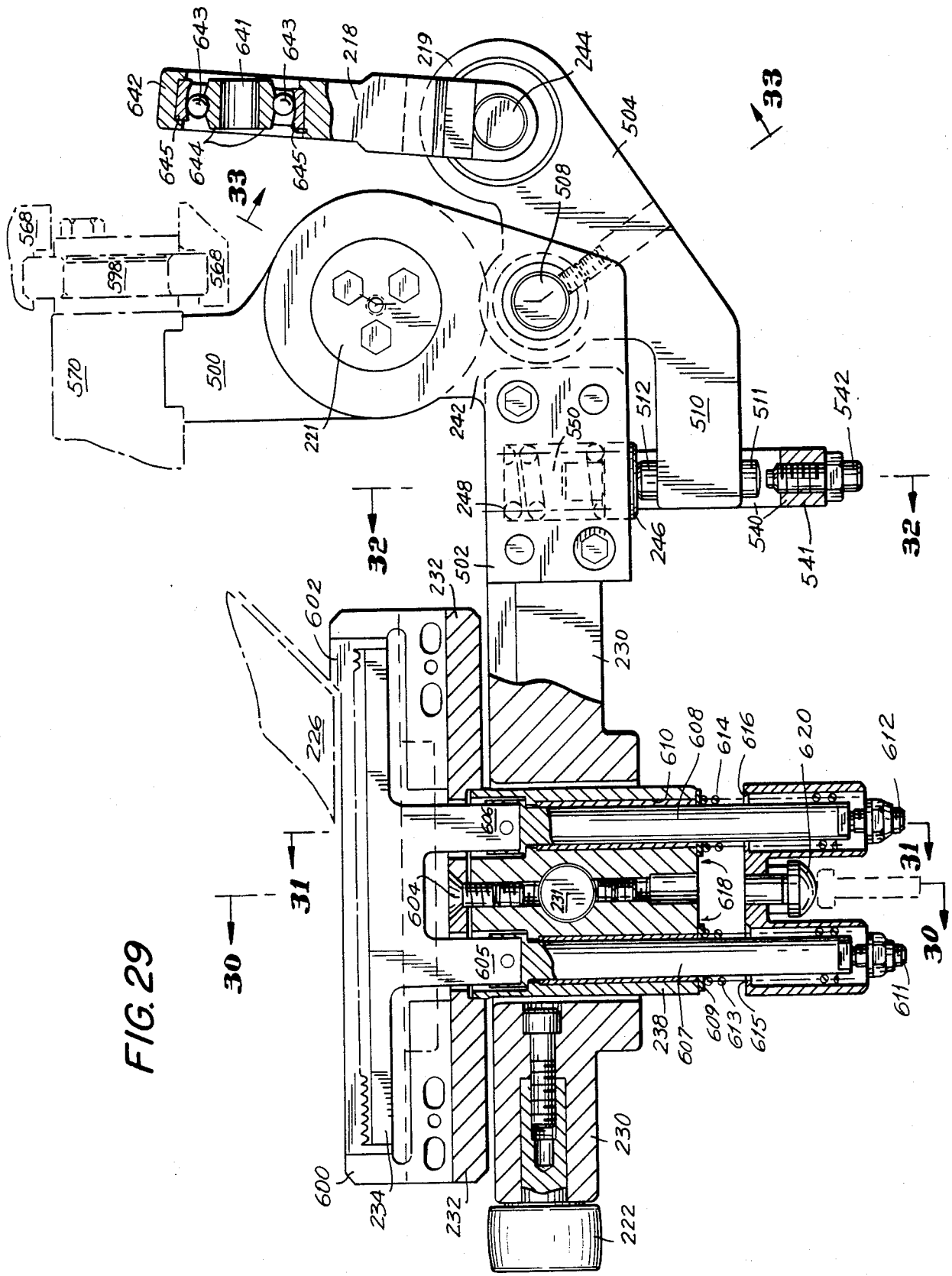
FIG. 29 is a top sectional view of the anvil assembly of FIG. 23.
Figure 30:
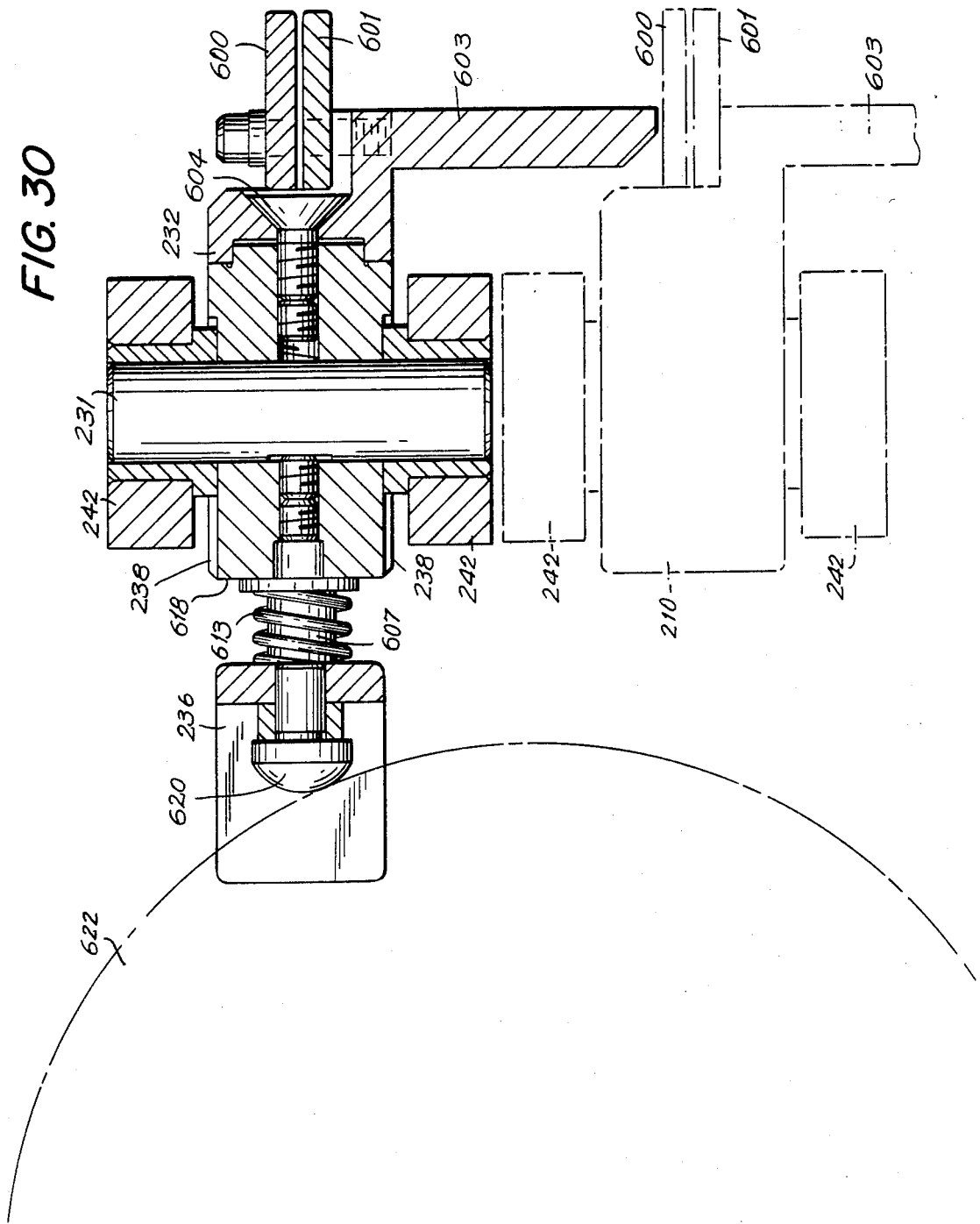
FIG. 30 is a side sectional view of FIG. 29 taken along line 30—30.
Figure 31:
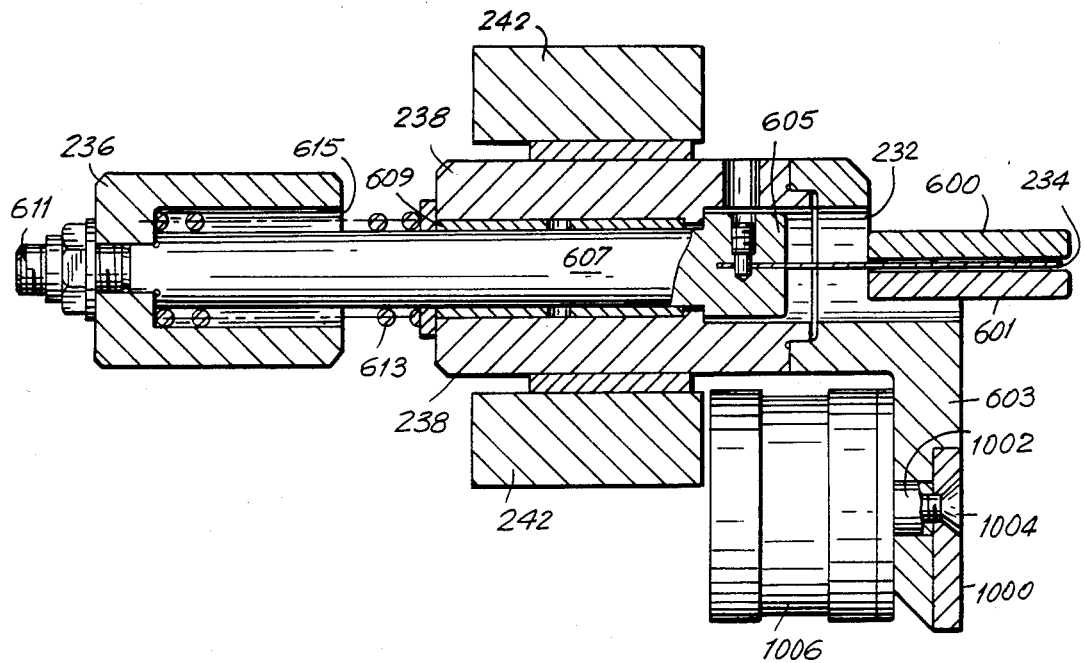
FIG. 31 is a side sectional view of FIG. 29 taken along line 31—31.
Figure 32:
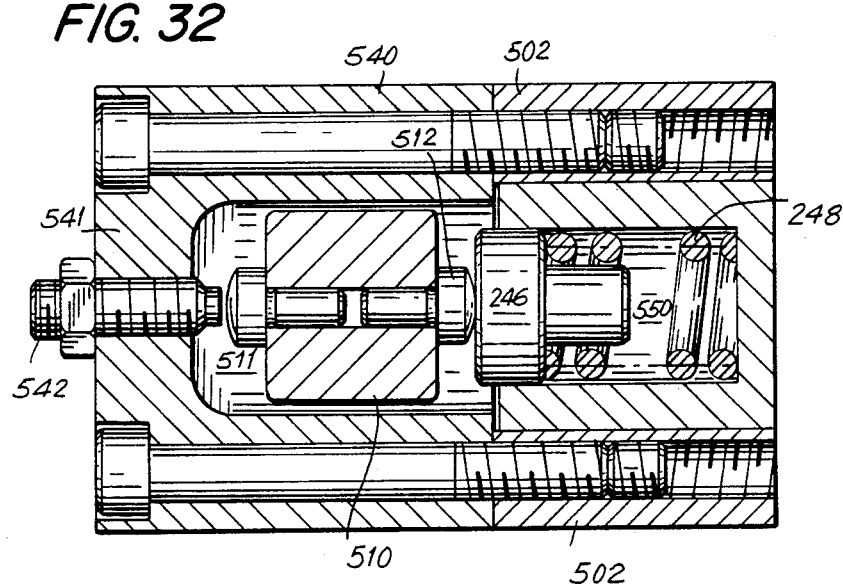
FIG. 32 is a side sectional view of FIG. 29 taken along line 32—32.

Referring to FIGS. 23, 29, and 32, compression spring hinge apparatus 240 comprises hinge 242, pivot 244, piston 246 and compression spring 248. Hinge 242 is pivotally mounted to cross seal wheel 200 at pivot 221 on member 500 and contains mounting bracket 502 for connecting hinge 242 t anvil jaw 210. Lever 504 is pivotally mounted to hinge 242 at pivot 508 which is arranged at a location that can be shifted along a radius extending from the center of pivot 221. Lever 504 contains boss 219 and arm 510. Arm 510 is mounted so that it extends into yoke 540 (see FIG. 32) and has contacting pins 511 and 512. Yoke 540 may be secured to mounting bracket 502 by two bolts. Piston 246 is mounted between mounting bracket 502 on compression spring 248 in cylinder 550. Contact pin 512 is disposed towards piston 246. In cross member 541 of yoke 540 is adjustable set screw 542. Contact pin 511 is disposed towards set screw 542.

The other end of lever 504 contains boss 219 which contains pivot 244 and is pivotally connected to pushrod 218 which is connected at its other end to a cammed twin-lever arm fulcrum system.

Figure 25:
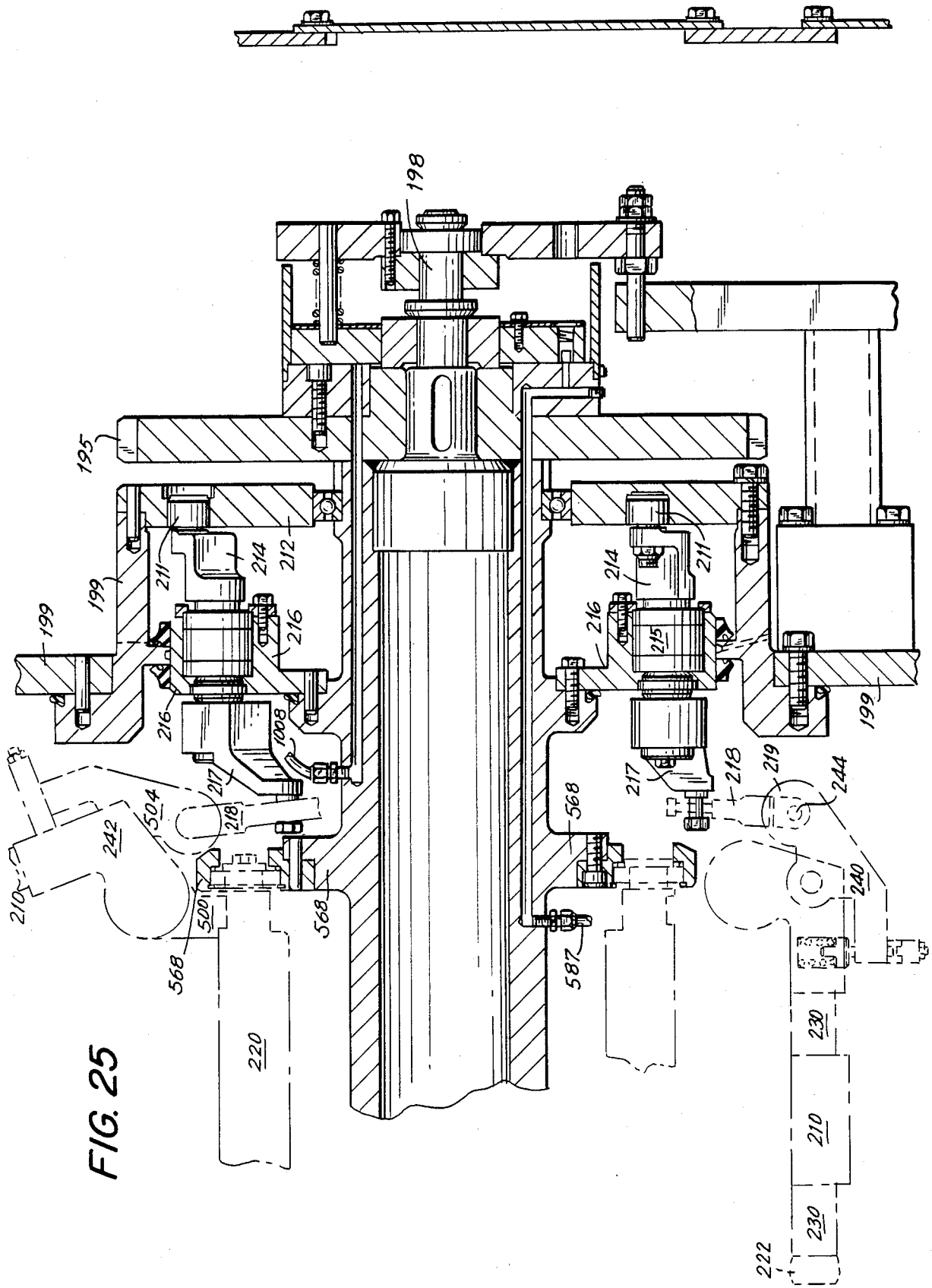
FIG. 25 is a partial front cross sectional view of the cross seal wheel guide mechanism shown in FIG. 23.

Referring to FIGS. 23, 25, and 29, the cammed twin lever fulcrum system comprises lever arms 214 and 217 connected together at bearing 215 which is mounted for rotation in flange 216, extending from and about cross seal wheel 200. Cam follower 211 is attached to one of the lever arms, for example, lever arm 214, and is adapted to run in grooved cam 212 which, mounted to housing 199, is stationary relative to the rotating cross seal wheel. Flange 216 is adapted for receiving a plurality of bearings 215 corresponding to the plurality of sealing mechanisms.

The lever arms transfer the rotational movement of bearing 215 into translational movement of pushrod 218 to open and close anvil jaw 210 about its pivot point 221. As cam follower 211 moves along the grooved path, any change in position of cam follower 211 relative to the axis of bearing 215 will cause a proportionate rotational change in position of lever arm 217 at about the point of connection to pushrod 218. Therefore, the noncircular path of the groove in cam 212 causes lever arm 217 to rotate and thereby causes pushrod 218 to translate in or out. Because pushrod 218 is connected to boss 219 of lever 504 which is connected to anvil jaw 210 which is hingeably connected to cross seal wheel 200 at pivot 221, movement of pushrod 218 causes anvil jaw 210 to open and close as cam follower 211 moves relative to bearing 215.

Figure 40:
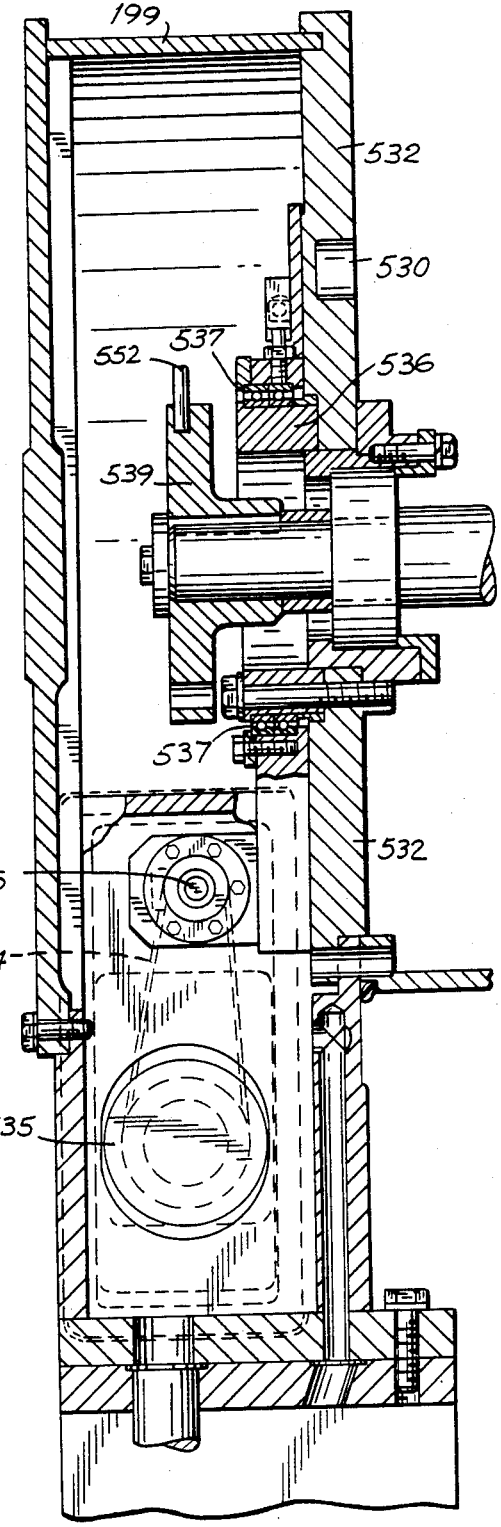
FIG. 40 is a rear cross sectional view of FIG. 39 taken along lines 40—40.
Figure 41:
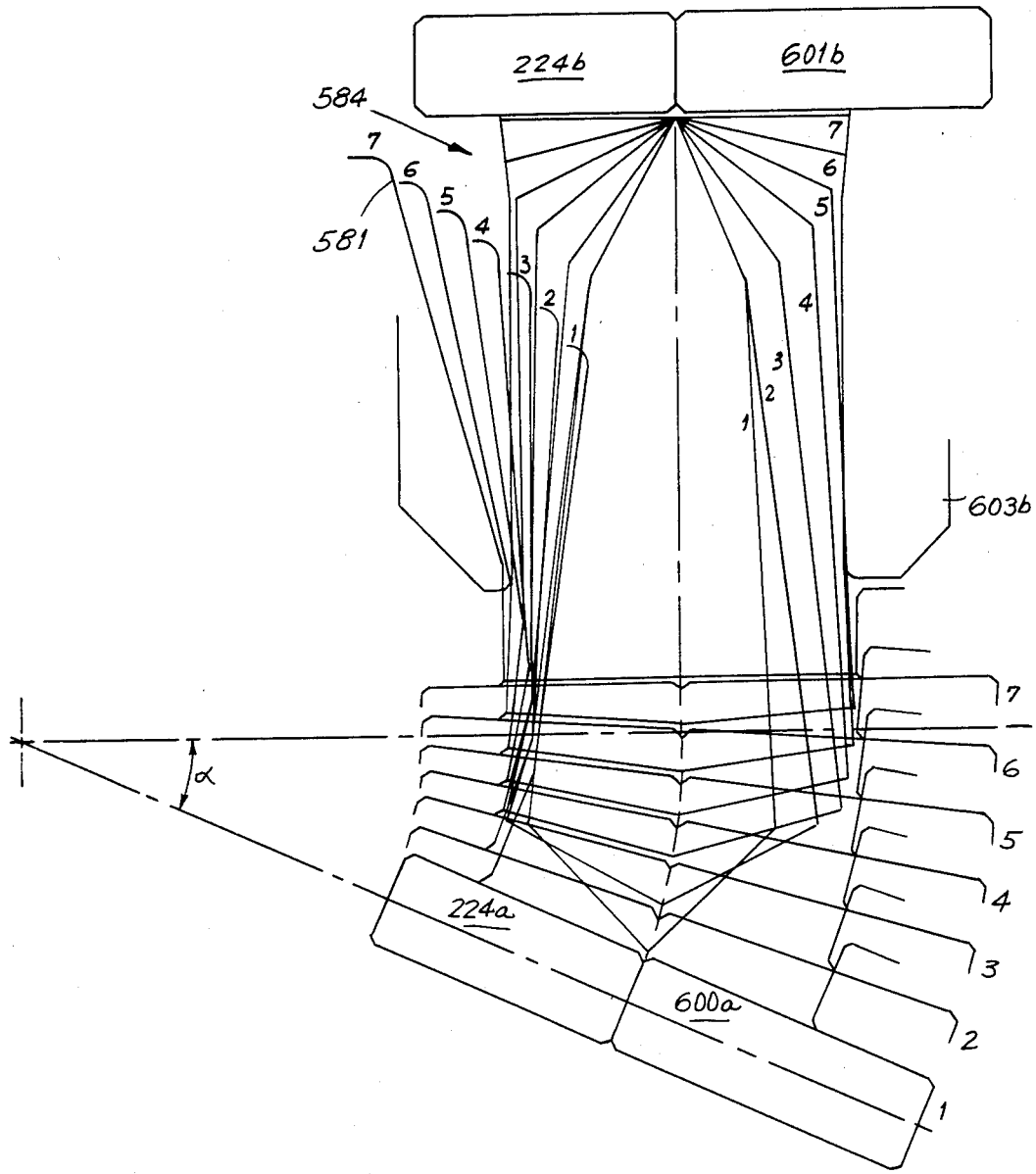
FIG. 41 is a schematic illustration of the movement of the adjacent sealing mechanisms of FIG. 21 during the bricking operation.

In operation, anvil arm 210 rotates about pivot 221 until contact is made with sealing jaw 220. Cam follower 211 continues to move the lever arm linkage system in the same direction for a few degrees more, but because arm 210 is in contact with jaw 220, the point of pivot changes from 221 to 508. Bracket 510 thus pivots about pivot 508, compressing low pressure spring 248 and ensuring that arm 210 is fully closed and clamping on tube 22 with sufficient pressure to cut off liquid flow. A gap develops between pin 511 nd set screw 542 which allows a slight movement of arm 210 when compressing high pressure springs 596 (FIG. 6) without exerting a large force on cam follower 211. By adjusting set screw 542, the relative position of arm 210 can be modified with respect to cam follower 211 by a small amount. This adjustment is made so that all fifteen anvil arms close at exactly the same nominal angular orientation of the cross seal wheel. This setting is also made in combination with setting the angular orientation of jaw 220 at the time of closing, in the nominal closing position, to ensure that all fifteen heads fold around equal portions of web 22. Other setting screws adjust the nominal angular orientation of the sealing mechanism (jaws 210 and 220) so that they are all the same. Thus, the fifteen sealing mechanisms are at same angle and close at same time to pick up the same amount of web, unless movable cam 534 (FIGS. 37, 40) is moved from the nominal position as explained below.

In order to accommodate the side to side motion of pushrod 218 as it translates back and forth to operate lever 504, pushrod 218 may be provided with conventional self aligning ball bearing 642 having a sufficient range of motion to permit smooth action of lever 504 as pushrod 218 moves side to side and back and forth.

Conventional self aligning ball bearings 648 are provided to operate boss 219 of lever 504 to accommodate any side to side motion of pushrod 218 at boss 219.

Figure 33:
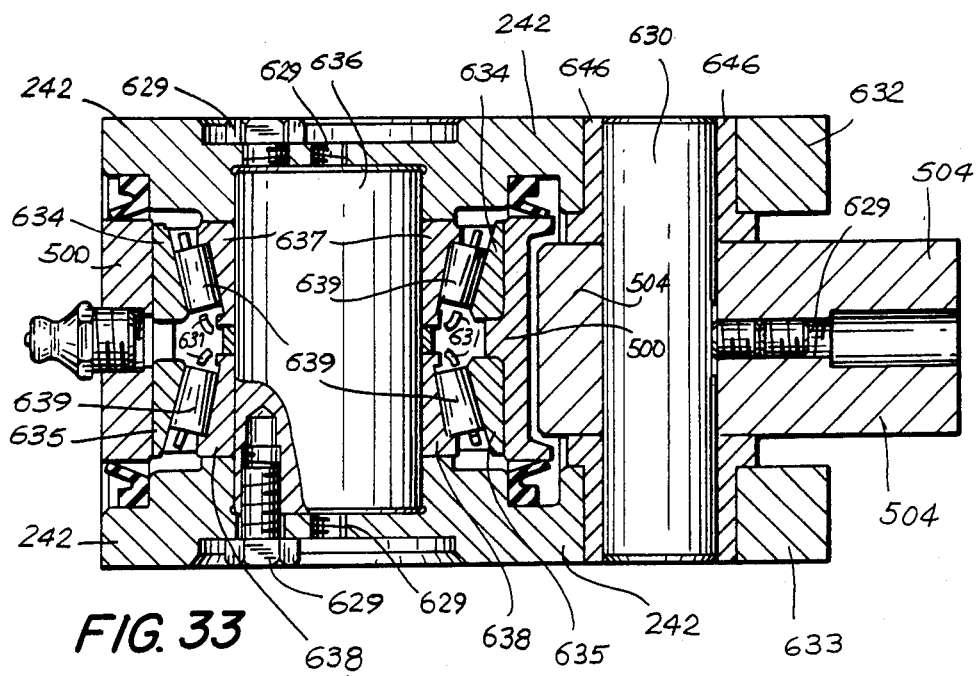
FIG. 33 is a side sectional view of FIG. 29 taken along line 33—33.

The hinge assembly for pivots 221 and 508 are shown in FIGS. 29 and 33. Lever arm 504 is secured to pivot shaft 630 by set screw 629. Hinge 242 has two flanges 632 and 633 that straddle lever 504 and pivot freely about shaft 630. Member 500 has a ring of material extending about shaft 636 and has two beveled rings 634 and 635 on its inner diameter substantially parallel to and spaced from bevels 637 and 638. In between bevels 634, 635 and 637, 638 are a plurality of bearings 639 adapted to simultaneously roll along beveled surfaces 637 and 634 or 638 and 635 so that member 500 is centered about hinge 242 as it pivots about shaft 636. Bearings 639 preferably have a cylindrical or conical cross section. Means for retaining bearings 639 in place may be provided, for example, lips or bosses at the extreme edges of bevels 637 and 638 or retaining wires 631, as shown in FIG. 33. Hinge 242 may be bolted to shaft 636 to form pivot 221, by bolts 629.

Referring to FIGS. 21, 22, 23, 29, 31, 35, and 36, anvil jaw 210 comprises arm 230, boss 238, head 232, cutting means 234, and cutting drive means 236. Arm 230 is an elongated structural support member and may be made of any material capable of withstanding the force requirements of pressing and cutting, for example, reinforced phenolics, nylons, epoxy fiberglass composites, stainless steel, graphite, and the like. Boss 238 extends from the center of arm 230 and houses cutting means 234 and cutting drive means 236.

Extending along the front surface of arm 230 is head 232 which comprises parallel anvil surfaces 600 and 601, flange 603 and bolts 604 for securing head 232 to boss 238 of arm 230. Anvil surfaces 600 and 601 are spaced apart a distance sufficient to permit passage therebetween of cutting means 234. Preferably, cutting means 234 is a knife having a sharp cutting blade surface (e.g., serrated) capable of severing flattened tube 22, with the blade cutting edge being longer than flattened tube 22 is wide so as to cut entirely across tube 22 during the severing operation. Anvil surfaces 600 and 601 are preferably comprised of rigid nonconductive reinforced material and during transverse clamping are urged into contact with tube 22 in opposition to sealing jaw 220 as anvil jaw 210 is closed by passage of cam follower 222 along cam 212. Anvil surfaces 600 and 601 may be coated with an abrasive resistant material to reduce wear, a release material that promotes separation of sealed packages 30 after having been severed from tube 22 as the sealing mechanism opens and anvil jaw 210 separates from package 30, or both.

Figure 22:
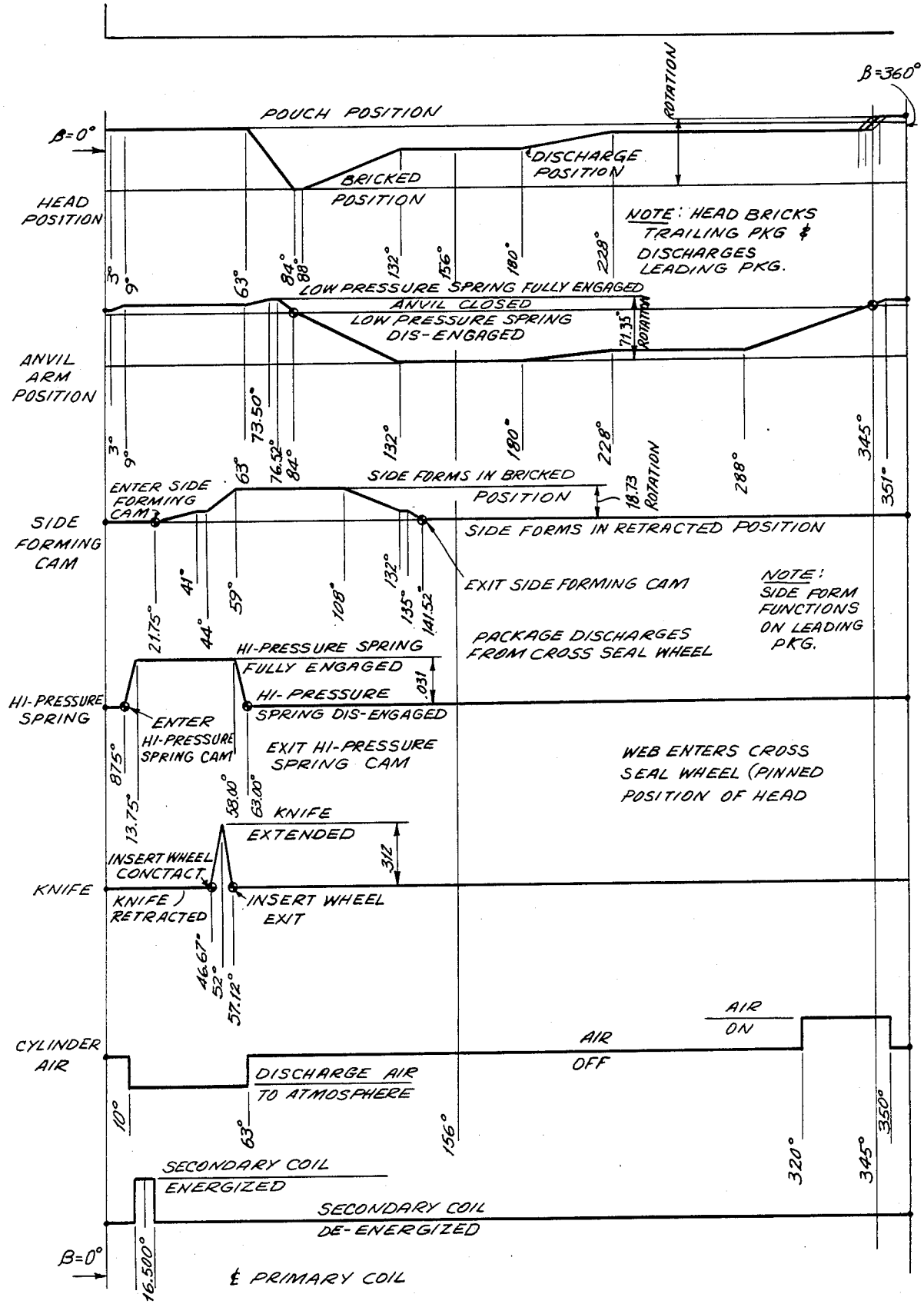
FIG. 22 is a timing chart of the operation of a cross seal wheel in accordance with the present invention.

Flange 603 serves as a package preforming surface as described below. Mounted flush in flange 603 is pusher plate 1000 which is connected to shafts 1002 by bolts 1004. Shafts 1002 are adapted to slide axially in bushings 1010 under the control of air drive cylinder 1006 and source of air pressure 1008. Pusher plate 1000 can be extended out from flange 603 to help control the volume of product in tube 22 as tube 22 is clamped off by the sealing mechanism as described below. Air pressure is typically used to extend plate 1000 under the control of a conventional slide valve plate (not shown). When one of bushings 1010 is adjacent to the valve plate, air passes from the end of pipe 1008 therethrough to extend the plate of that sealing mechanism. Extension occurs before the sealing mechanism closes and plate 1000 remains rigidly extended until after the mechanism closes. After closing, the sealing mechanism has advanced with cross seal wheel 200 so that bushing 1010 is no longer adjacent to the slide valve plate and plate 1000 is thereby cut off from pipe 1008 and its source of air. Consequently, during the bricking or preforming operation described herein, the compression of package 30 between adjacent sealing mechanisms causes plate 1000 to retract to be flush with flange 603. The timing of the extension of pusher plate 1000 is shown in FIG. 22.

Anvil surfaces 600 and 601 have a pronounced surface at area 602 that corresponds to the configuration of the end surface of sealing jaw 220. The purpose of pronounced area 602 is to interfit with end 582 of secondary coil 226 which tapers away from anvil jaw surfaces 600 and 601 to urge the longitudinal seal in a folded position for preforming. By folding the longitudinal seam towards the package panel, it relieves stress placed on the seam by the preforming operation and prevents tearing the web at the point where the edge of the seal is held tightly between the sealing and anvil jaws as the package is preformed.

The rear surface of cutting means 234 contains extensions 605 and 606 that pass into boss 238 and are connected to shafts 607 and 608, respectively. Shafts 607 and 608 are adapted for movement perpendicular to anvil surfaces 600 and 601, sliding within apertures 609 and 610 extending through boss 238 to advance and retract cutting means 234. Shafts 607 and 608 are connected at their non cutting ends to cutting drive means 236 by means of threaded ends 611 and 612, respectively. Compression springs 613 and 614 are respectively mounted about shafts 607 and 608 between rear surface 618 of boss 238 and cutting drive means 236 so that a portion of springs 613 and 614 and shafts 607 and 608 are within apertures 615 and 616, respectively, of cutting drive means 236.

Referring to FIGS. 26-29, compression springs 613 and 614 bias cutting drive means 236 away from rear surface 618 of boss 238 so that cutting means 234 is normally retracted. Affixed to the rear of cutting drive means 236 is contact pin 620. Contact pin 620 is associated with free wheel 622 which, upon contact with pin 620, acts to drive contact pin 620 towards anvil arm 210 to compress compression springs 613 and 614 and extend cutting means 234 out from between anvil surfaces 600 and 601, through tube 22 and into a corresponding recess in sealing jaw 220 to sever tube 22. The anvil jaw knife assembly is pivotably connected to arm 230 and flange 238 by post 231. This permits final alignment between the anvil and sealing jaws as they close about tube 22.

Free wheel 622 comprises circular cam 624 fixedly mounted to cylinder 625 which is rotatably mounted to pin 626 by means such as ball bearings illustrated at 628. Pin 626 is rigidly mounted to frame 11 with sufficient support to remain substantially parallel to anvil jaw 210. In operation, free wheel 622 is located in the area where the seal is to be severed and aligned with contact pin 620 so that as the sealing mechanism advances along its path and cam follower 222 follows track 202 after the transverse seal has been made, contact pin 620 comes into contact with free wheel 622. As the sealing mechanism continues to advance, contact pin 620 begins to ride along free wheel 622 which begins to rotate and thus causes compression springs 613 and 614 to compress as cutting means 234 extends. The stroke length and period of cutting means 234 is thus determined by the radius of curvature of cam 624 and the relative interference between cam 624 and contact pin 620. The location of free wheel 622 is thus selected to sever tube 22 at the appropriate location and time as the plurality of sealing mechanisms and cutting means 234 travel about the cross seal wheel periphery and sequentially contact wheel 622. In the preferred embodiment, the severing step occurs after the tube has been transversely sealed and before anvil arm 210 is opened. The severing step occurs while tube 22 is clamped between anvil arm 210 and sealing jaw 220 under high pressure to minimize the amount of web pulled into cutting groove 223 during cutting. The timing and location of the cutting step is preferably as far downstream of the sealing section as possible before cam follower 222 begins to exit high pressure cam 202. This permits maximum seal cooling before, and prevents coating the knife with hot thermoplastic during, cutting.

Referring to FIGS. 4-12, 21, 24 and 26-29, sealing jaw 220 comprises support member 570, secondary induction coil 224, and support member mounting bracket 572 connected to induction coil 224 and member 570.

In the preferred embodiment, secondary induction coil 224 comprises two current carrying faces, circular receiver coil 225 and elongated heating coil 226, electrically in series so that the current induced in receiver coil 225 also passes through elongated heating coil 226. Receiver coil 225 is preferably designed to maximize the current induced therein as the coil passes through a fixed electromagnetic field radiated by intermediary induction work coil 761, connected to r-f generator 650. Coil 225 is typically coupled to coil 761 at a distance of about 0.020 to 0.030 inches.

In the preferred embodiment, receiver coil 225 comprises a single turn substantially circular copper loop mounted in a housing for concentrating the electromagnetic energy. Any conventional radio frequency generator could be used as long it is capable of producing the power required for the sealing operation energy level, preferably in the range from about 3 to 5 kw at about 650 KHz.

Figure 4:
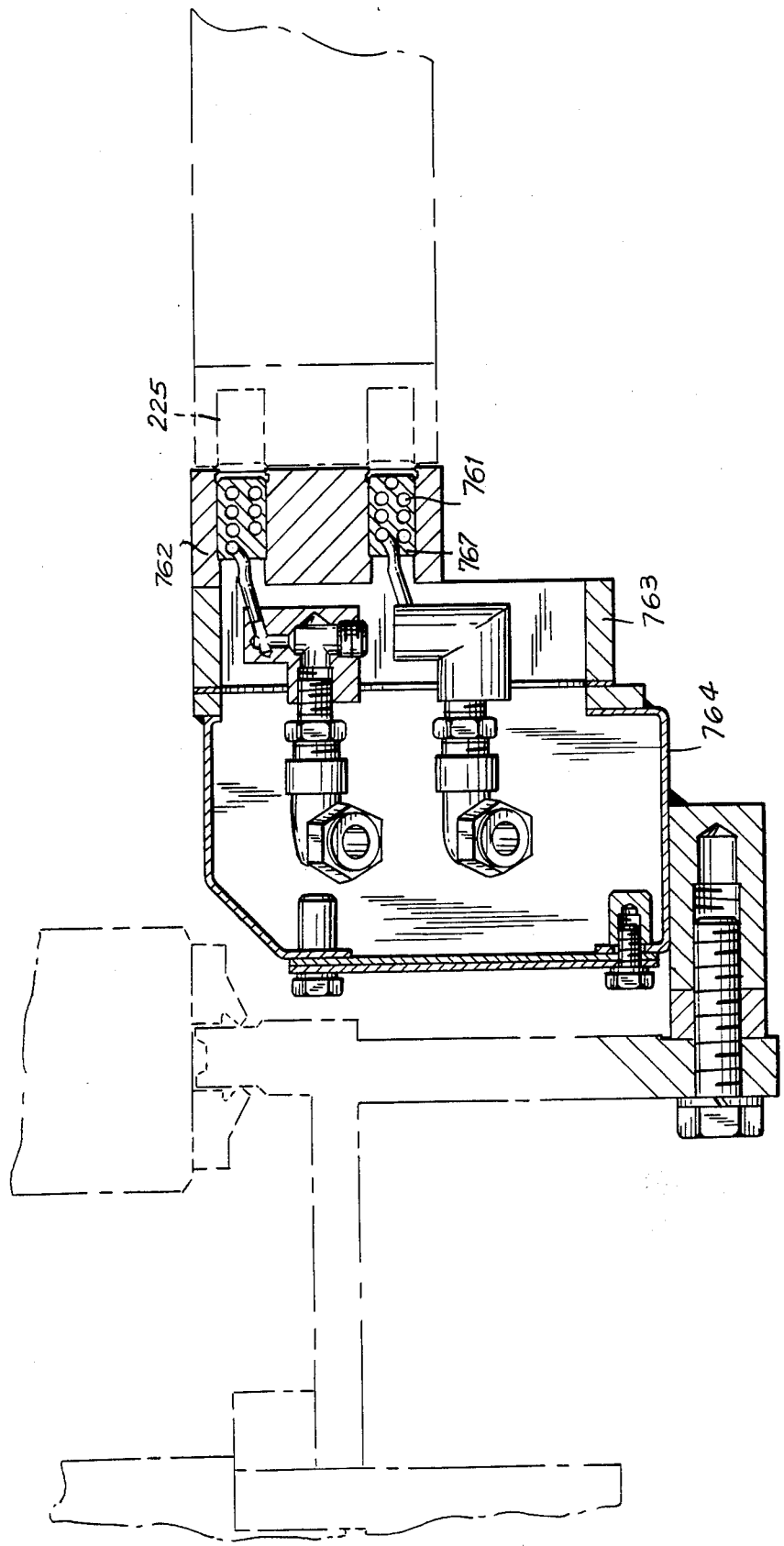
FIG. 4 is a sectional schematic view of a primary work coil adapted for use with the present invention.

Referring to FIG. 4, coil 761 is preferably a multiple loop oval cylindrical type coil having a long axis large enough to permit inducing a current in coil 225 of secondary coil 224 for a period of time adequate to heat the metallic layer of web 20 during the time coil 225 moves across the face of coil 761. Coil 761 is mounted in housing 762 and may be imbedded in nonconductive medium 767, e.g., epoxy, to maintain the coil configuration rigid. Coil 761 may be hollow and have a coolant circulating therethrough. In an alternate embodiment, coil 761 could be a pancake type coil of appropriate dimensions.

The plurality of transverse sealing mechanisms on cross seal wheel 200 are arranged so that coil 225 of each secondary induction coil 224 is exposed to the electromagnetic field generated by coil 760 for the necessary period of time to form each transverse seal.

One advantage of the configuration shown in the Figures is that no means for cooling the coil is required. However, other configurations requiring cooling may be used, for example, using heat dissipating fins or a cooling fluid circulating through passageways interior to the coil.

Conductive loop 228a (FIG. 10) may be imbedded in dielectric or insulating material 575 within a channel in rigid support member 576 to prevent coil section 225 from short circuiting, arcing, or physically shifting under the electromagnetic forces it is subjected to. Rigid support member 576 may be ferrite or other magnetic material to concentrate the electromagnetic radiation to maximize the current induced in coil 225 and to electrically couple the field from primary coil 760 to conductive loop 228a of coil 225.

Elongated coil 226 is designed with a thin and relatively broad current carrying face 227 to generate an electromagnetic field that will induce currents in the metallic foil layer of the polyfoil web tube 22 in the area immediately adjacent face 227 of elongated coil 226. Tube 22 is clamped under high pressure so that product 32 is squeezed from between the clamped web and when the thermoplastic layers are heated conductively by the currents induced in the metallic foil layers they will fuse together homogeneously. In the preferred embodiment, elongated coil 226 is also a half turn copper loop conductor 228b mounted on flanges 229, covering substantially all of face 227 of elongated coil 226. Other current carrying conductors could be used, particularly those having greater wear or deformation resistance such as molybdenum, copper alloys and the like. The current carrying conductor 228b forms an elongated loop around groove 223 which is adapted to receive the cutting edge of cutting means 234 after it severs tube 22.

Because of the well known skin depth phenomenon, a relatively thin layer of current conductor 228b may be used to distribute the current flowing in the secondary induction coil across the width and length of flattened tube 22 to form the desired seal area corresponding to face 227. A conductor material, e.g., oxygen free copper, laid on rigid support member 572 (FIG. 8), e.g., reinforced phenolics, epoxy fiberglass, ceramics, or similar substantially nonconducting compositions, may be used. The conductor must be thick enough to satisfactorily conduct the current density required to melt the polyfoil without itself melting or warping. Abrasive resistant material 573 may cover conductor 228b in a relatively thin coating to prevent wear. Material 573 also may include release promoting materials to promote release of the exterior thermoplastic coating of tube 22 from face 227 after the seal has been made. Material 573 also may include a dielectric or insulating material to prevent secondary induction coil 224 from shorting or arcing during use, thereby preventing spot burns on tube 22. Material 573 also may have a high thermal conductivity so as to conduct heat away from elongated coil 226 when not excited, thereby maintaining secondary coil 224 cool by conduction. Alternately, material 573 may have a low thermal conductivity to prevent the heat generated by current flowing in conductor 228b from conducting therethrough to soften the outer thermoplastic layer of tube 22, but sufficient to permit conductor 228b and coil 226 to cool before being energized during the next cycle.

In the preferred embodiment, receiver coil 225 is oriented at right angles to elongated coil 226 and rigidly bolted into position by bracket 577 and bolts 580. Conductive buss bar 578 connects one end of conductor 228a of coil 225 to one end of conductor 228b of coil 226, and conductive buss bar 579 connects the other ends of conductors 228a and 228b of coils 225 and 226 together, thus forming the single turn secondary coil of the preferred embodiment.

Conductor 228b extends past end 582 of elongated coil 226 and around the back side of coil 226. The clamping pressure of bolts screwed into holes 571 achieves an electrical connection of the center tap of coil 220 to the machine frame which is electrically grounded. This prevents current arc-over to the web during operation. End 582 of elongated coil 226 is beveled away from face 227 in order to follow the contour of the opposing surface 602 (see FIG. 29) so that the tube will be completely sealed to the edge. Beveled end 582 is adapted to fit within protrusion area 602 of anvil jaw flanges 600 and 601 to relieve stresses to the vertical seal area and form a good mechanical interface for folding the longitudinal seam and even distribution of forces along the sealing and clamping area.

Secondary induction coil 224 is mounted to rigid support member or mounting bracket 572 by a plurality of bolts. Mounting bracket 572 comprises lower flange 584 having a plurality of fingers 583 and upper flange 585 having a plurality of fingers 581 which are used in preforming package 30 into a substantially rectangular configuration. In the preferred embodiment, one of fingers 583 contains an ejection means 586 for blowing a pulse of air out aperture 587 against a side wall of package 30 after it has been severed from tube 22 to eject it from cross seal wheel 200. Fingers 583 and 581 are configured so that fingers 581 of the leading sealing mechanism and fingers 583 of the following sealing mechanism intermesh and can pass through their respective planes corresponding to flanges 585 and 583 without contacting as the sealing mechanisms advance as cross seal wheel 200 rotates. See FIG. 34. A second stationary slide valve plate (not shown) adjacent cross seal wheel 200 may be used to cause a pulse of air to be blown out aperture 587 in ejection means 586 against the wall of package 30 to eject it.

Figure 5:
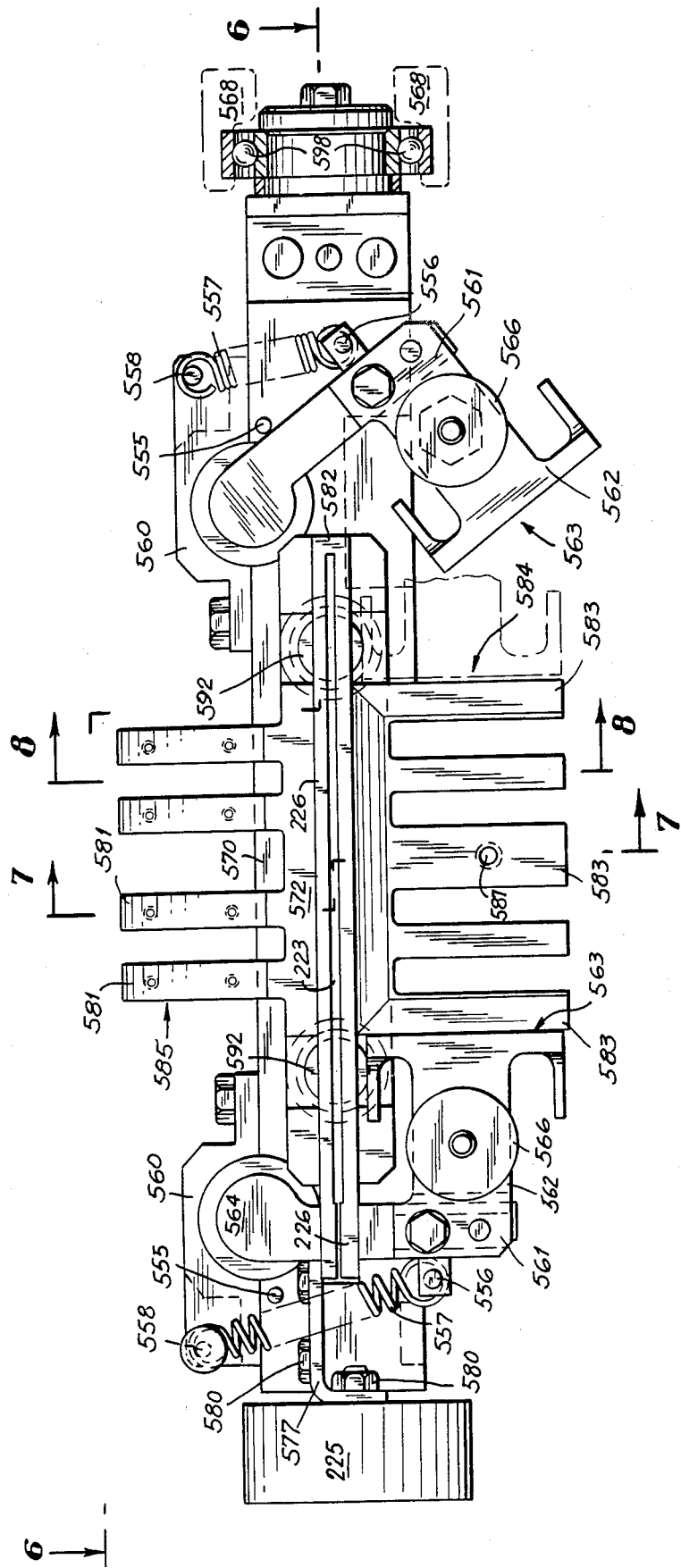
FIG. 5 is a face view of a sealing jaw in accordance with the present invention.
Figure 6:
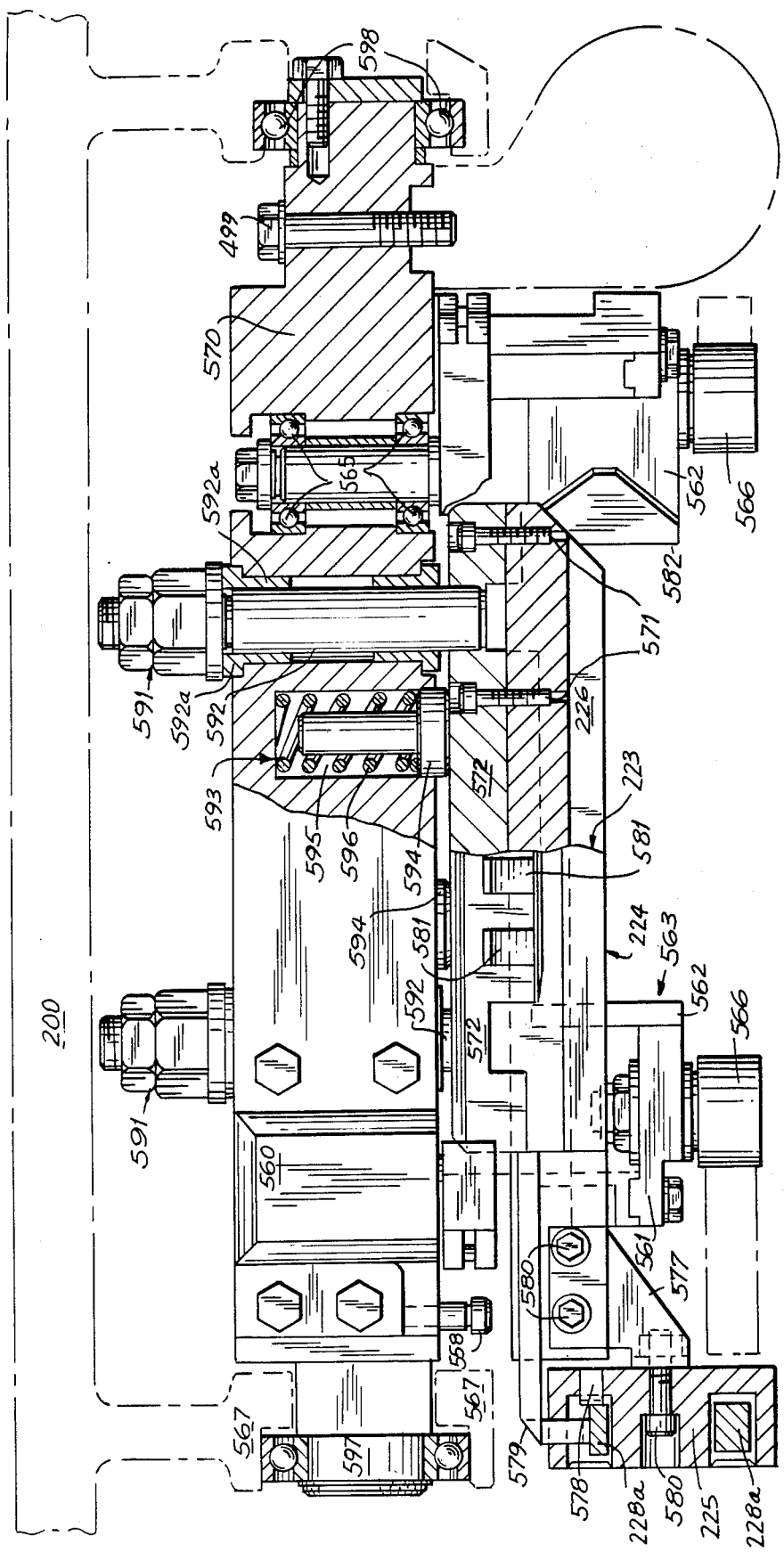
FIG. 6 is a top sectional view of FIG. 5 taken along line 6—6.
Figure 7:
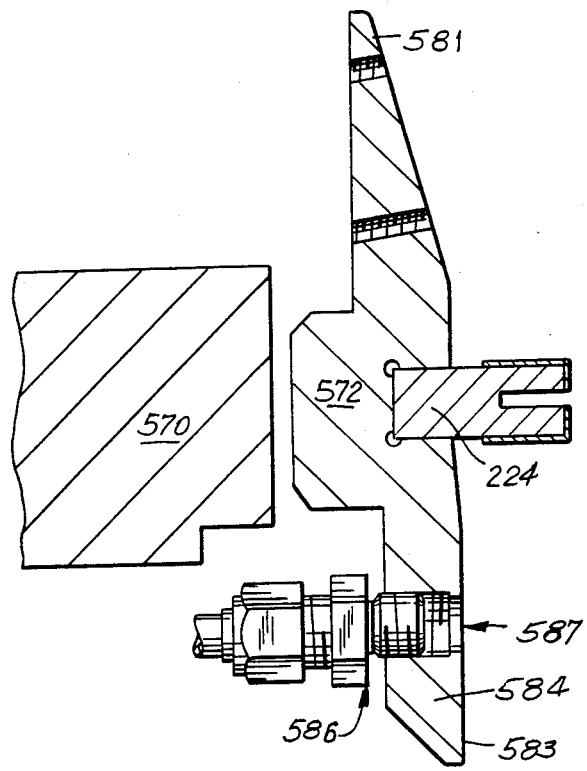
FIG. 7 is a side sectional view of FIG. 5 taken along line 7—7.
Figure 26:
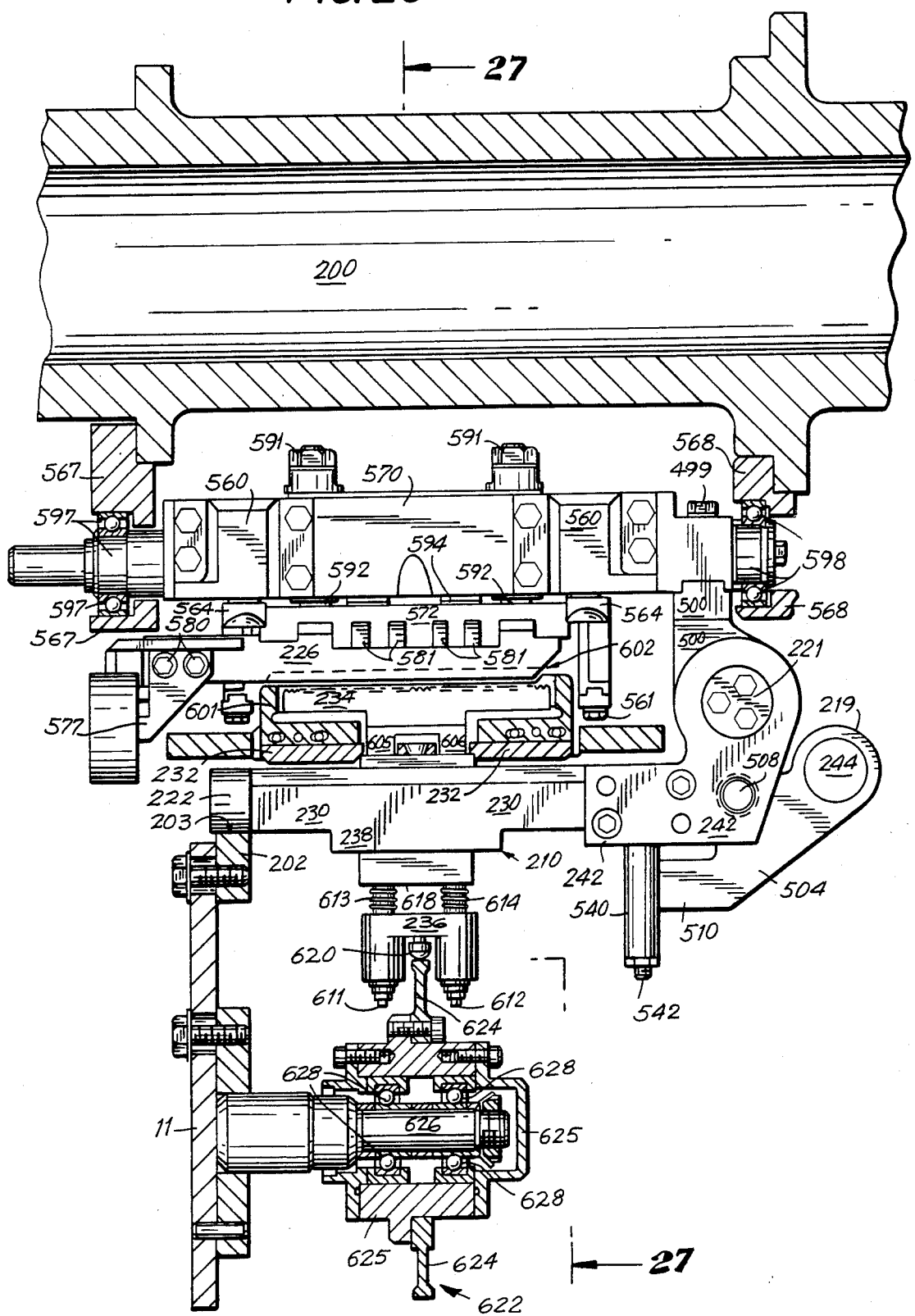
FIG. 26 is a top cross sectional view of FIG. 21 taken along line 26—26.

Referring to FIGS. 5, 6, and 26, bracket 572 is mounted on support 570 by a suspension means comprising guide shafts 592 and resilient means 593. Guide shafts 592 pass through bushings 592a, are bolted to support member 570 by nuts 591 and pass through support member 570 into corresponding cylinders in bracket 572. Each resilient means 593 is mounted in support 570 and comprises piston 594 mounted in cylinder 595 on compression spring 596. It provides a high pressure deflection means for controlling pressure so that as anvil jaw 210 and sealing jaw 220 are closed to compress tube 22 flatly, secondary coil 224 and its mounting bracket 572 will contact resilient means 593 and must overcome the force provided by spring 596 before bracket 572 will move the small distance towards rigid support 570. A small gap exists, e.g., about ⅛ inch, for passing, for example, a double thickness of web 20 or a web splice, without jamming the apparatus. In the preferred embodiment, two resilient means 593 are shown spaced apart about the expected height of a finished package 31. Having more than one resilient means provides for a relatively even distribution and absorption of the forces resulting from closing anvil jaw 210 and sealing jaw 220. The spacing also provides for better control of the transverse sealing and severing operation and reduces wear on the sealing mechanism. Resilient means 593 work in cooperation with pivot 231 which allows both faces of anvil jaw 210 and sealing jaw 220 to remain parallel while the high pressure clamping forces are evenly distributed along the web. The combination also provides for rotation of the sealing mechanism. Further, as the high pressure spring is set, the angle of anvil jaw 210 about pivot 231 will change to keep the jaws parallel and maintain equal pressure along the web.

Rigid support 570 is secured to cross seal wheel 200 at its respective ends by means of conventional rotatably mounted roller bearings 597 and 598 in flanges 567 and 568 of cross seal wheel 200. Flanges 567 and 568 are similar to flange 216 (FIG. 23) in that they have a plurality of apertures spaced around cross seal wheel 200 adapted for receiving a plurality of sealing jaws 220 of construction identical to the jaw described above.

Also mounted on support member 570 and underneath housing cap 560 are a pair of side members 562 arranged in opposition and capable of being rotated about their respective shafts 564 secured between housing cap 560 and member 570. Side members 562 are adapted for pressing in opposing top and bottom of package 30 during the bricking operation. Shafts 564 are mounted for rotation by means of roller bearings 565.

Side members 562 comprise L-shaped structure 561 affixed to one end of shaft 564 having a substantially flat pressing surface 563 of a surface area somewhat less than the surface area of the top or bottom panel of a finished brick 31. Mounted on the lower leg of each L-shaped structure 561 is cam follower 566 which is adapted to follow respective opposing fixed cams 559 for causing pressing face 563 to rotate about shaft 564 into contact with package 30 to brick package 30. Spring 557 connected at one end to post 558 on rigid member 570 and at the other end to post 556 secured to the bottom of L-shaped structure 561 biases L-shaped structure 561 in the open position, with presser face 563 away from and not in contact with tube 22.

Cam 559 has a controlled cam profile to simultaneously close the side members in a timed relationship with the rest of the bricking operation so that the package is bricked substantially simultaneously. Referring to FIG. 22, the side forming cam is moved into the bricking position when the adjacent sealing mechanisms are in the fully bricked position. The bricking operation preferably occurs after the transverse seal is made and after the package has been severed. The action of cam followers 566 and cams 559 overcome the forces of springs 557 to close side members 562. Stops 555, in conjunction with springs 557, serve to limit the extreme open position of side members 562 and to prevent side members 562 from moving while not in use. See FIG. 5. In other embodiments, the bricking operation could be performed before the severing operation and even before the sealing operation, once advancing tube 22 has been securely clamped.

Referring to FIGS. 5, 6, 23, and 26, anvil jaw 210 is securely connected to sealing jaw 220 to form a single sealing mechanism. Bolts 499 extending through rigid member 570 extend into member 500 to secure its members together so that anvil jaw 210 and sealing jaw 220 are in the same plane relative to each other. Further, cutting means 234 of anvil jaw 210 will extend into gap 223 of sealing jaw 210 when the jaws are closed, to sever flattened tube 22.

Referring to FIGS. 23, 24, 37, and 38, the angular orientation of the sealing mechanism is controlled by a cammed lever-pivot system. The angular orientation is defined as the angle between the plane in which anvil jaw 210 will move relative to sealing jaw 220 and the radial plane between the axis of cross seal wheel 200 and the center longitudinal axis of rigid member 570 mounted on the periphery of, and at a distance from the axis of cross seal wheel 200. The angular orientation pivots about the axis of rigid member 570 of sealing jaw 220.

The cammed lever-pivot system comprises lever arm 520, bearing 522, and shaft connectors 524. Shaft connector 524 comprises first unit 525 connected to the end of rigid member 570 on the side of flange 567 not having secondary induction coil 224, and second unit 526 connected to shaft 527 running through the axis of bearing 522. First unit 525 and second unit 526 are connected together so that their axes are aligned and will rotate as one shaft, thereby altering the orientation of rigid member 570 and the transverse clamping and sealing mechanism as shaft 527 rotates. Bearing 522 is mounted for rotation in flange 528, which is perpendicular to the axis of cross seal wheel 200, and adapted to hold a plurality of bearings 522 corresponding to each of the sealing mechanisms. Lever arm 520 is connected to the side of bearing 522 opposite shaft connector 524 and extends from bearing shaft 527 at an angle so that rotation of shaft 527 about its longitudinal axis would cause the end of lever arm 520 to trace a circle. Cam follower 529 is rotatably mounted at the end of lever arm 520 and is adapted to travel in cam groove 530 of cam 532.

Cam groove 530 thus controls the position of lever arm 520 relative to the axis of shaft 527 and thereby controls the orientation of the sealing mechanisms.

As cam follower 529 runs along cam groove 530, its angular position relative to the axis of shaft 527 may change at predetermined locations along the groove so that the plane of orientation of the anvil and sealing jaw, relative to a given radius, shifts. In the preferred embodiment, cam 532 is designed so that after the tube has been transversely sealed and severed, package 30 undergoes the previously mentioned bricking designed to crease the scorelines in package 30 by substantially forming package 30 into its final shape temporarily, without necessarily leaving package 30 in its final desired shape, e.g., rectangular brick 31.

To accomplish the bricking operation, cam groove 530 is cut so that cam followers 529 of adjacent sealing mechanisms rotate about their respective bearing shafts 527 and so that at least of of the sealing mechanisms deflects from its normal orientation and the adjacent pair of sealing mechanisms act in concert to compress package 30 against flanges 603, 584, opposing side member surfaces 563, and the top of the leading anvil and sealing jaws and the bottom of the following anvil and sealing jaws in their closed position. Thus, package 30 is urged into a substantially rectangular configuration defined by the aforementioned boundaries. In the preferred embodiment, during package compression the flanges are configured to provide 100% closure, i.e., the final rectangular shape with all of the opposing sides in parallel and perpendicular to the other sides. The cavity size formed by the flanges is preferably slightly less than the intended size of finished package 31, e.g., 97% of the finished package volume or size.

When the bricking operation is complete and package 30 has been preformed, cam groove 530 returns cam follower 529 to its normal angular position. Similarly, side members 562 retract and preformed package 30 is retained on flange 584 by wire guide means (not shown).

Figure 37:
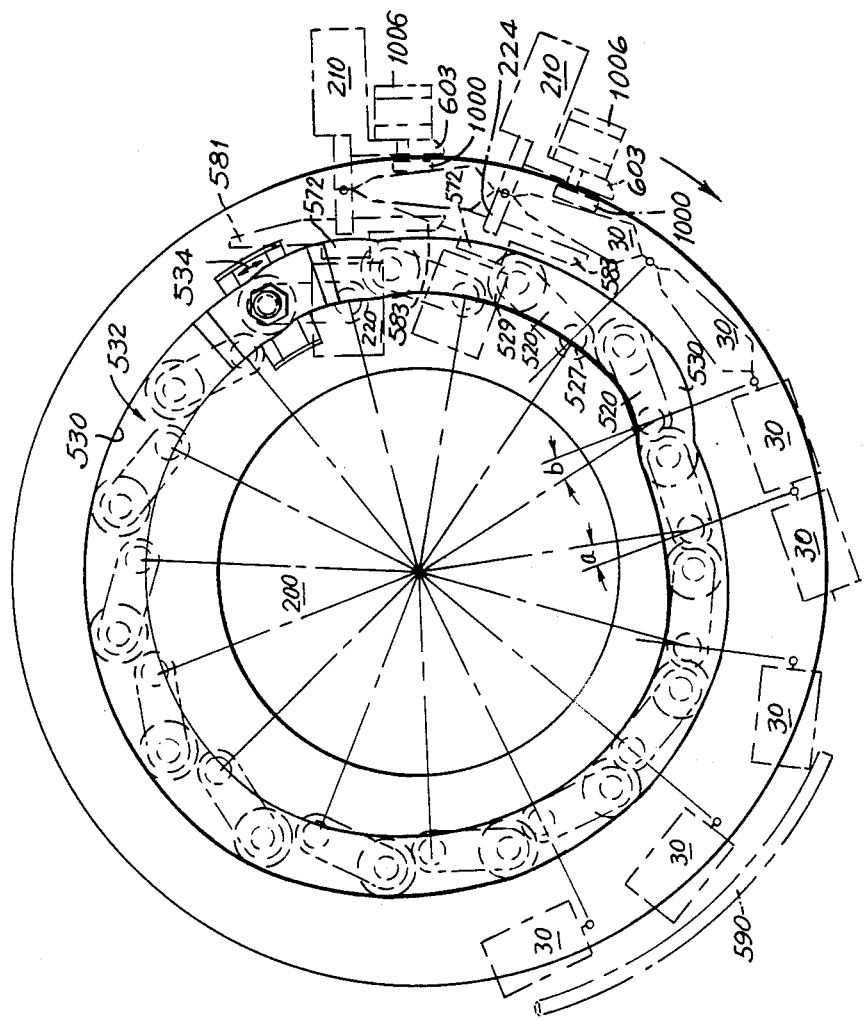
FIG. 37 is a side sectional view of FIG. 23 taken along line 37—37.
Figure 39:
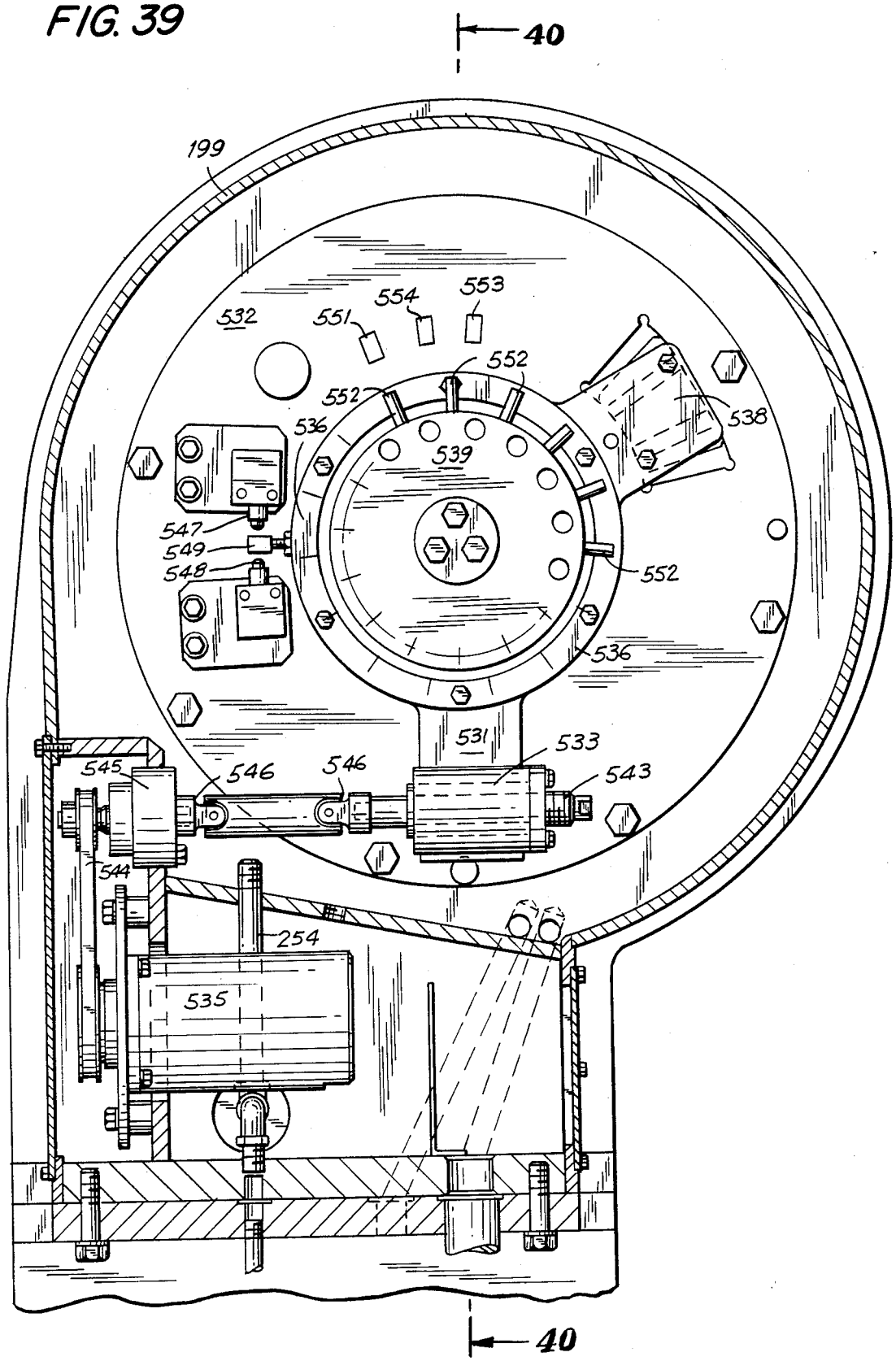
FIG. 39 is a side sectional view of the segmented cam assembly in accordance with the present invention.
Figure 42:
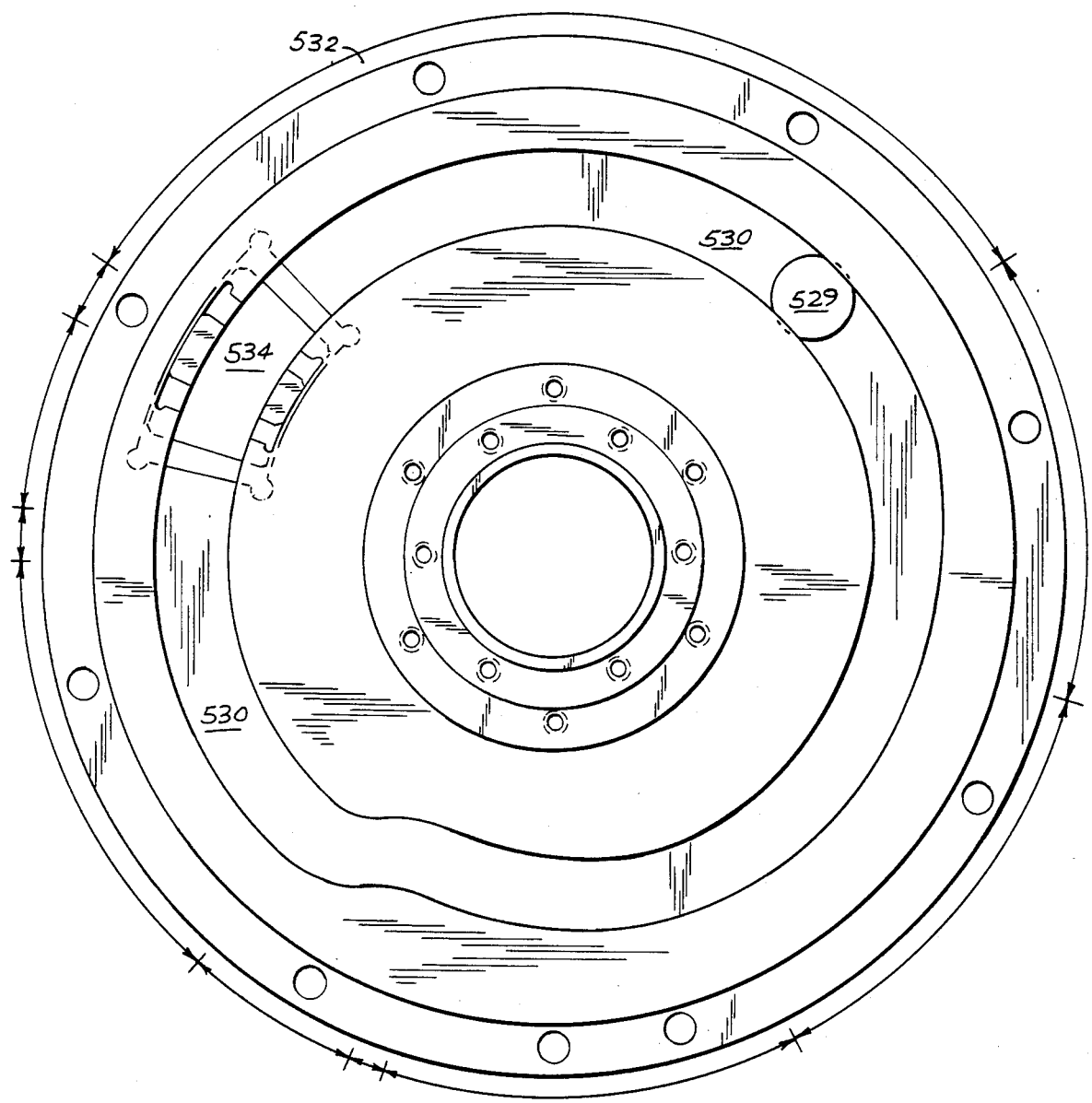
FIG. 42 is a face view of the volume control cam in accordance with the present invention.

As illustrated in FIGS. 21 and 42, cam groove 530 is designed to maintain the normal angular position of a given sealing mechanism in an advanced orientation so that the angular orientation is forward of a radial plane, then to retard the angular orientation behind the radial plane relative to the normal position, so as to aid in bricking the package following that sealing mechanism against the next following sealing mechanism in its normal position. The leading sealing mechanism is then advanced to return it to its normal position, still grasping preformed package 30. As the sealing mechanism returns to its normal orientation, anvil jaw 210 opens and package 30 is held e.g., by the use of fixed guide rails 590 until transferred to transfer conveyor 280, as illustrated in FIGS. 21, 27b, 28, and 37. In FIG. 37, the maximum degree of angular advance is shown as angle b and the degree of angular retard is shown as angle a, both preferably about 12° as compared to the 0° radial orientation. Setting angle a equal to angle b provides for 100% closure of the package on all six sides. The degree of advance and retard may vary for different sized packages. In an alternate embodiment, cam 530 could maintain the sealing mechanism in a radial orientation and then simultaneously advance the trailing mechanism while retarding the leading mechanism to compress package 30 between the adjacent sealing mechanisms. Other variations within the mechanical tolerance of web 20 could also be applied.

Referring to FIGS. 37–42, movable cam 534 and its control system is shown. The movable cam system controls the pitch or angular orientation of the sealing mechanism as anvil jaw 210 is closed to press tube 22 flat against sealing jaw 220. This occurs as tube 22 is segmentally bent about the periphery of cross seal wheel 200, and may be used to aid in controlling the volume of product within the tube as the tube is clamped transversely.

The change in angular orientation relative to the nominal radial orientation adjusts the precise placement of anvil jaw 210 along tube 22. Given the substantially constant speed of cross seal wheel 200, face 227 of sealing jaw 220 moves at a tangential speed slightly less than the velocity of tube 22 as it comes in contact with descending tube 22. The relative difference in speed accounts for the web taken up by the bulging of the package as it is clamped, sealed and preformed. When tube 22 is pinched, it is restrained by the sealing mechanisms and deviates from its generally downward path to follow the curve traced by cross seal wheel 200 for the arc length defining the transverse clamping, sealing, cutting, and bricking section. As the tube begins to travel around the contour of cross seal wheel 200 after the preceding package is clamped, it causes the sides of tube 22 to compress as the following sealing jaw contacts tube 22 which makes tube 22 thinner and thereby reduces the cross sectional area and the corresponding volume of product 32 in that portion of the advancing tube. Thus, by controlling where about the periphery of wheel 200 the sealing mechanism will clamp the end of tube 22 to form the next package 30, the volume of product 32 in that tube end can be controlled or adjusted.

Cam section 534 is capable of being moved forward or back along an arc length in cam groove 530 by servo stepping motor 535. In the preferred embodiment, the surface of cam 534 affects the angular orientation of cam follower 529 as it runs along groove 530 which advances (or retards) the sealing mechanism as anvil arm 210 clamps securely across tube 22. Thus, by moving cam segment 534 along cam groove 530, the location of transverse closure can be selected within the range defined by the arc length the cam can move along.

Cam section 534 is secured to boss 538 of plate 536 which is rotatably mounted about the axis of cross seal wheel 200 by means of preloaded ball bearings 537. Preloaded bearings 537 minimize shifts in cam alignment as cam section 534 is periodically loaded and unloaded. Plate 536 has second boss 531 at the end of which is a housing having ball screw 533 with interior threads along the inner cylinder walls. Threaded post 543 is mounted inside ball screw 533 so that as threaded post 543 rotates, cylinder 533 moves relative to post 543.

The rotation of threaded post 543 is controlled by stepping motor 535 through drive belt 544, pulley 545, and universal joints 546. Pulley 545 is fixed in frame 11 so that it rotates but does not move axially. Consequently, threaded post 543 rotates without moving axially as stepping motor 535 rotates. Because plate 536 is adapted to rotate about the axis of cross seal wheel 200, when threaded post 543 rotates the result is movement of cylinder 533, plate 536, and movable cam section 534. Universal joints 546 permit threaded post 543 to bend relative to the axis of pulley 545 as cylinder 533 moves along its radius as plate 536 rotates. Stop sensor means 549 and contacts 547 and 548 on plate 532 are disposed to cause motor 535 to stop advancing when movable cam section 534 is already at the extreme end of its predetermined range of travel. Contacts 547 and 548 may be conventional limit switches.

In the preferred embodiment, once the cam position is selected for a given web and product under operating conditions, it is typically left in the same position throughout the production run. In situations where a machine is dedicated to producing a single size product, once the proper dimensions and closure point are determined, the movable cam segment may be fixed in place or omitted entirely. However, in appropriate circumstances, cam 534 may be dynamically adjusted as necessary to control the volume of product 32 in package 30 without having to halt production.

Transfer conveyor 280 is shown in FIGS. 1 and 21 to receive packages 30 from cross seal wheel 200 after they have been preformed for transfer to further processing apparatus not forming a part of this invention to form the finished product.

Referring to FIGS. 1, 2, 15, 20, and 21, immediately before tube 22 is clamped transversely, a pair of volume control fingers 360a and 360b contact the opposing sides of tube 22 along top package panel 39a and the bottom of the package comprising panels 46a and 46b (longitudinally sealed together at web ends 24 and 26). Volume control fingers 360a and 360b contact tube 22 to push on panels 39a, 46a, and 46b, changing the amount of product 32 in tube 22 by or to a predetermined amount. By varying the amount of push, the package volume can be adjusted within a preselected range. Tube 22 then is transversely clamped at the trailing portion of what will become package 30, having previously been clamped at the leading portion of the package by the preceding sealing mechanism, thereby fixing the volume of product 32 in tube 22 inside aseptic package 30 at its preselected volume.

This contact also initiates bending of tube 22, for example, along one or more of the preselected score lines, e.g., lines labeled A in FIG. 2, by compressing tube 22 adjacent the area of contact, facilitating subsequent package forming and bricking along the desired score lines.

The pair of fingers 360 have an oscillatory reciprocating motion moving in three dimensions, (i) towards tube 22 so that tips 361a and 361b extend past and straddle tube 22 (see FIGS. 15, 20), (ii) downwardly and towards each other, compressing tube 22 inwardly to fix the volume (see FIG. 20 in stepped positions), and (iii) withdrawing from each other and away from tube 22 and returning to a starting position to again contact tube 22 at the following location appropriate for contacting the successive packages. Tube 22 is later sealed at each transverse clamping (as described herein), forming the trailing edge of the preceding package and the leading edge of the next package to be formed. In the preferred embodiment, these edges become the side seams of a finished package. Fingers 360a and 360b may move downwardly at the same linear speed as tube 22, or may move at a faster or slower rate. Relative slippage will provide for contacting and bending more of the surface area of tube 22, if desired.

Referring to FIGS. 14–21, volume control fingers 360a and 360b are respectively screwed into mountings attached to the end of shafts 365a and 365b. For discussion purposes, only one volume control finger assembly will be discussed unless otherwise indicated by the suffixes a and b, although it is to be understood that the paired assemblies are complementary and arranged in opposition.

Shaft 365 is slidebly engaged in a bracket on subframe 370 which substantially confines movement of shaft 365, relative to subframe 370, to linear motion towards and away from tube 22. Four bearings 371 facilitate smooth translation of shaft 365 which is mechanically controlled by the rotation of cam 374.

At the end of shaft 365, opposite to finger 360, is bracket 378 that cooperates with bracket 379 attached to shaft 380. Brackets 378 and 379 are interconnected to comprise a universal joint. At the end of shaft 380, opposite to bracket 379 is bracket 381 which is interconnected to bracket 382, forming a second universal joint. Bracket 382 is connected to one end of arm 385 by means of threaded post 383 and adjustment nut 384 which may be rotated to adjust the effective length of threaded bolt 383 and the position of finger 360 relative to tube 22. Arm 385 is pivotally connected at pivot 387 to arm 388 mounted on frame 11 and has at its other end cam follower 390 which is located in groove 375 of cam 374. As cam 374 rotates, cam follower 390 will follow cam groove 375 and thus cause arm 385 to rotate about pivot 378 and slide shaft 365 towards and away from tube 22. The universal joints formed by brackets 378, 379, 381, and 382 permit smooth movement of shaft 365 as arm 385 oscillates and as subframe 370 is shifted perpendicular to the motion of arm 385 as discussed below. (Arm 385 preferably actuates both shafts 365a and 365b and fingers 360a and 360b in phase simultaneously.) Rotation of arm 385 to about its full inward displacement is shown in phantom lines in FIG. 14. Cam 374 is fixedly mounted to shaft 373 which is, in turn, rotatably mounted in frame 11 and driven by the machine motor.

Figure 19:
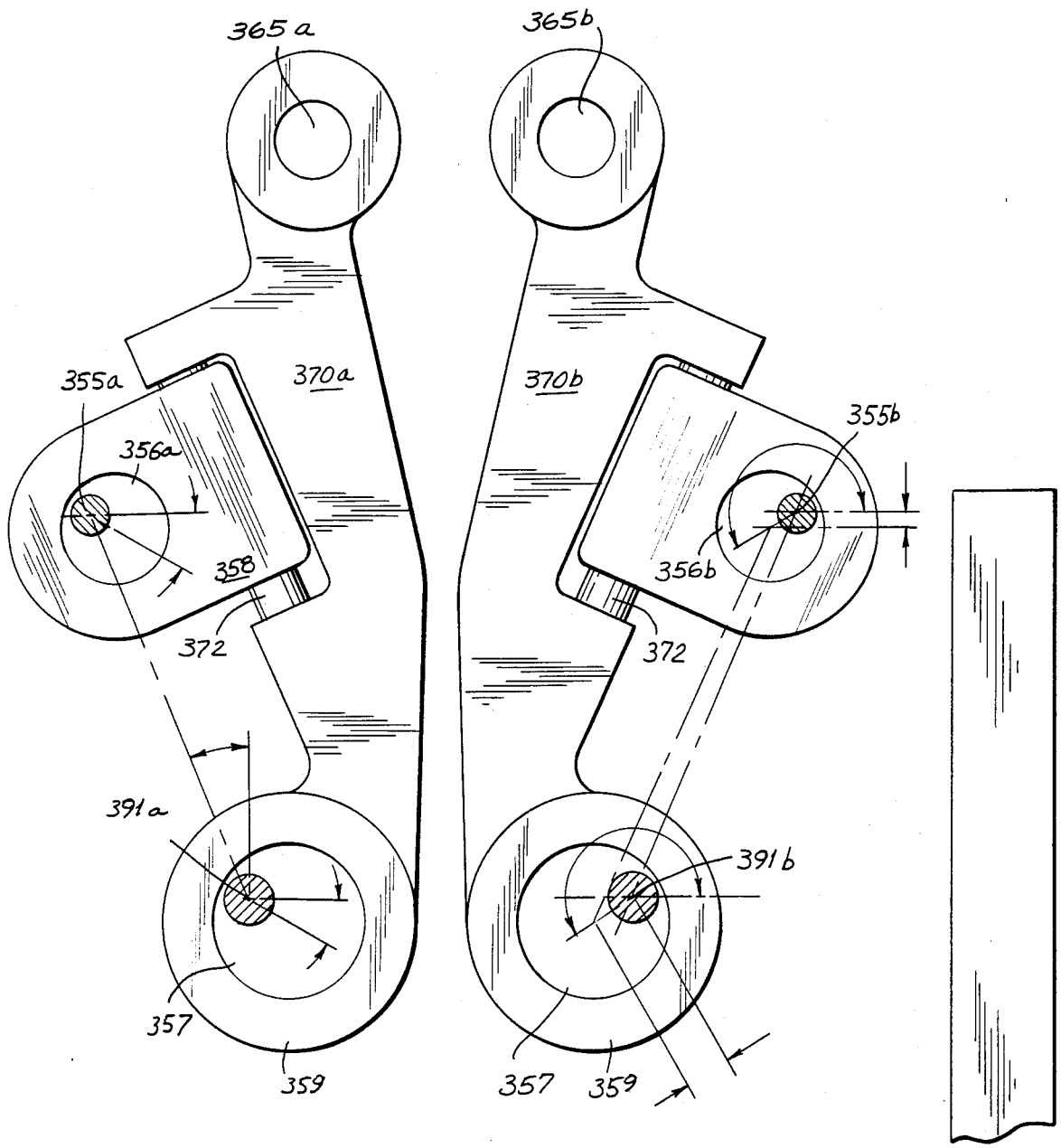
FIG. 19 is an illustrative partial sectional view of FIG. 17.
Figure 20:
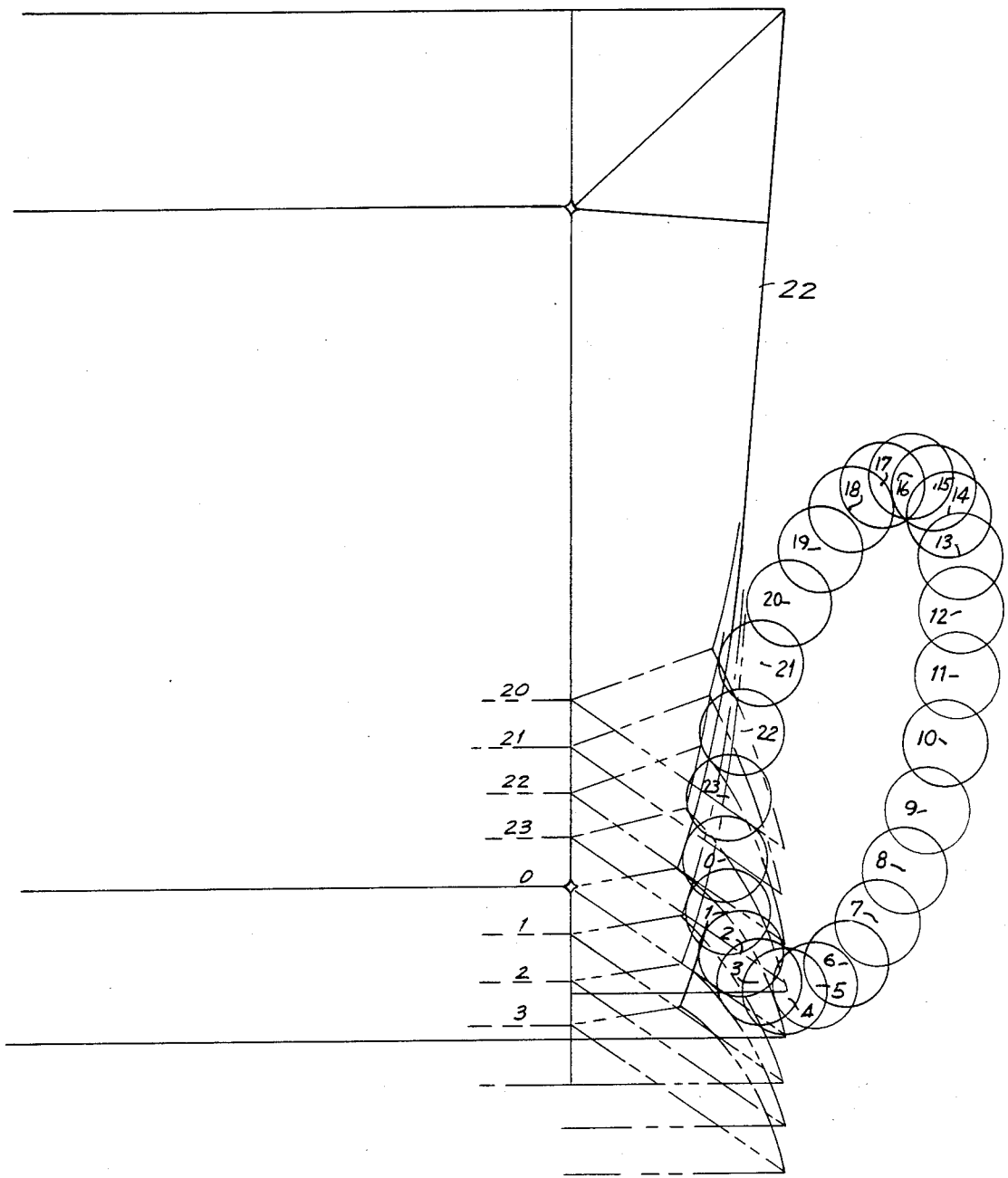
FIG. 20 is a schematic illustration of the movement of the volume control assembly finger of FIG. 19.

Subframes 370a and 370b are adapted for movement in two directions so that the brackets through which shafts 365a and 365b reciprocate move in an elliptical path. Referring to FIGS. 19 and 20, the elliptical path is controlled by the addition of circular motion about two different eccentrics arranged in high phase. The angle of the ellipse may be adjusted by controlling the additive configurations of the eccentrics. The center to center spacing of the elliptical paths may be adjusted by turning shaft 408 and 409 (FIG. 17) which screws or unscrew threads 440 into threaded boss 442 and changes the center to center distance.

Eccentric 356 is mounted on shaft 355 and rotates about shaft 355. Eccentric 356 is mounted for circular rotation in housing 358 so that housing 358 also moves about shaft 355, although it does not rotate. Similarly, eccentric 357 is mounted on shaft 391 for circular rotation in housing 359 so that as shaft 391 rotates, housing 359 moves about shaft 391 without rotating. Housing 359 is secured to subframe 370 so that the circular, but nonrotating, motion of housing 359 is imparted to subframe 370. Housing 358 is slidably connected to post 372 on a linear bearing and post 372 is securely fastened to subframe 370 at a point remote from housing 359. As shaft 355 rotates, the circular non-rotating motion of housing 358 causes housing 358 to both slide along post 372 and move post 372 in a direction towards and away from rotating shaft 355 (like a cam moves a pushrod).

The length of post 372 along which housing 358 moves axially must be long enough to absorb the relative differences in center to center distances between shaft 355 and eccentric 356 and shaft 391 and eccentric 357. The differences in center to center and diameters or curvature of the eccentrics determines both the shape of the elliptical path and the angle of the elliptical path, i.e., the angle formed between the major (or minor) axes of the ellipse and the perpendicular tube. A sequence of 23 positions of shaft 365b is illustrated in FIG. 20 showing the positions numbered 20-23, 0, and 1-3 as where, in the preferred embodiment, finger 360b contacts tube 22 as tube 22 advances and finger 360b advances in its elliptical path.

Shafts 391a and 391b and 355a and 355b are driven from bevel gears 407 and 406 which drive gears 393a and 393b which turn shafts 391a and 391b. At the other end of shafts 391a and 391b, away from gears 393a and 393b, are gears 394, 397, and 405 (a and b respectively) mounted in alignment for rotation in frame 369 and arranged so that gears 394 and 405 rotate in the same direction. Thus, shaft 355a is connected to gear 405a and rotates in the same direction as shaft 391a. Gears 393a and 393b and their respective elements are arranged with opposite rotations to provide mirror image substantially identical elliptical paths for fingers 360a and 360b in the brackets of subframe 370 for contacting tube 22. The combination of the elliptical motion and the reciprocating motion provides the three dimensional movement of fingers 360a and 360b to contact tube 22 and help fix the volume of product captured in tube 22 between adjacent sealing mechanisms.

One advantage of the present invention is that it is capable of manipulating the polyfoil web at high rates of speed to form uniformly filled packages. Specifically, the invention controls the volume of product in the tube as the tube is transversely clamped and segmentally bent while the tube is continuously advanced and filled with product.

Figure 8:
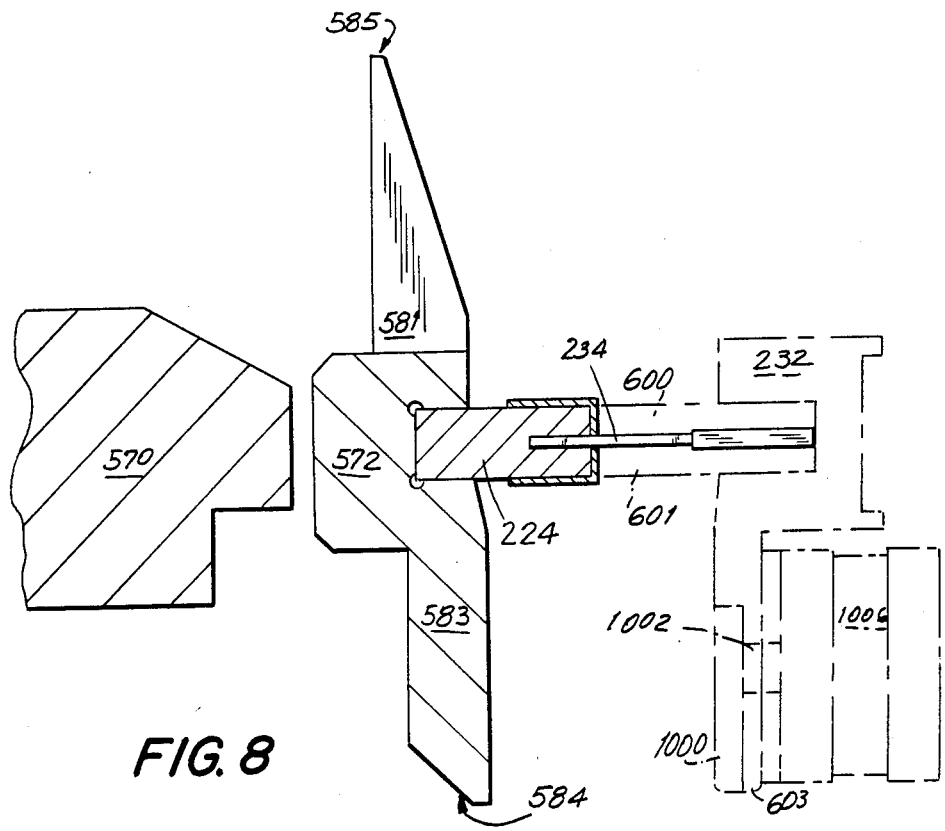
FIG. 8 is a side sectional view of FIG. 5 taken along line 8—8.
Figure 16:
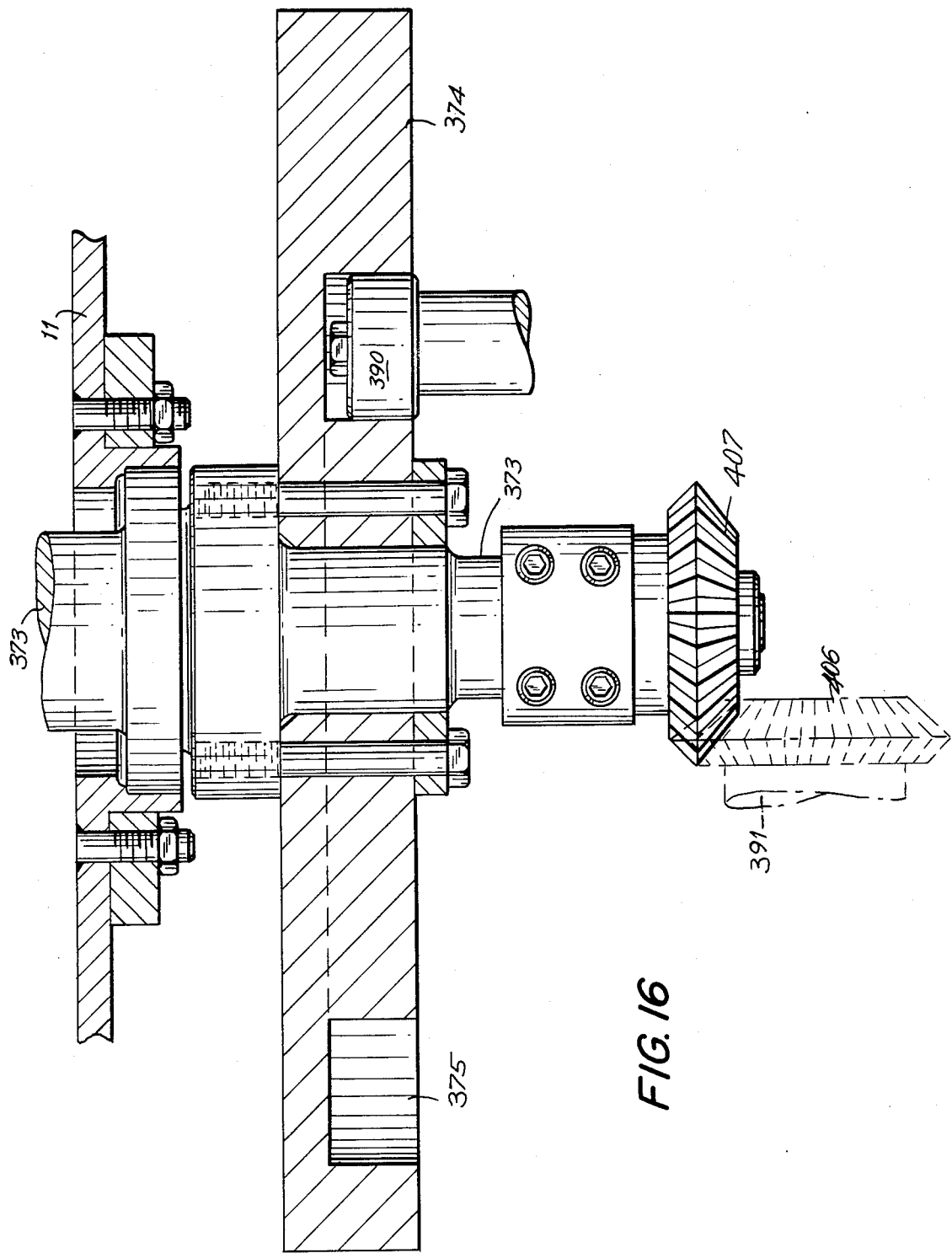
FIG. 16 is a top sectional view of FIG. 14 taken along line 16—16.
Figure 17:
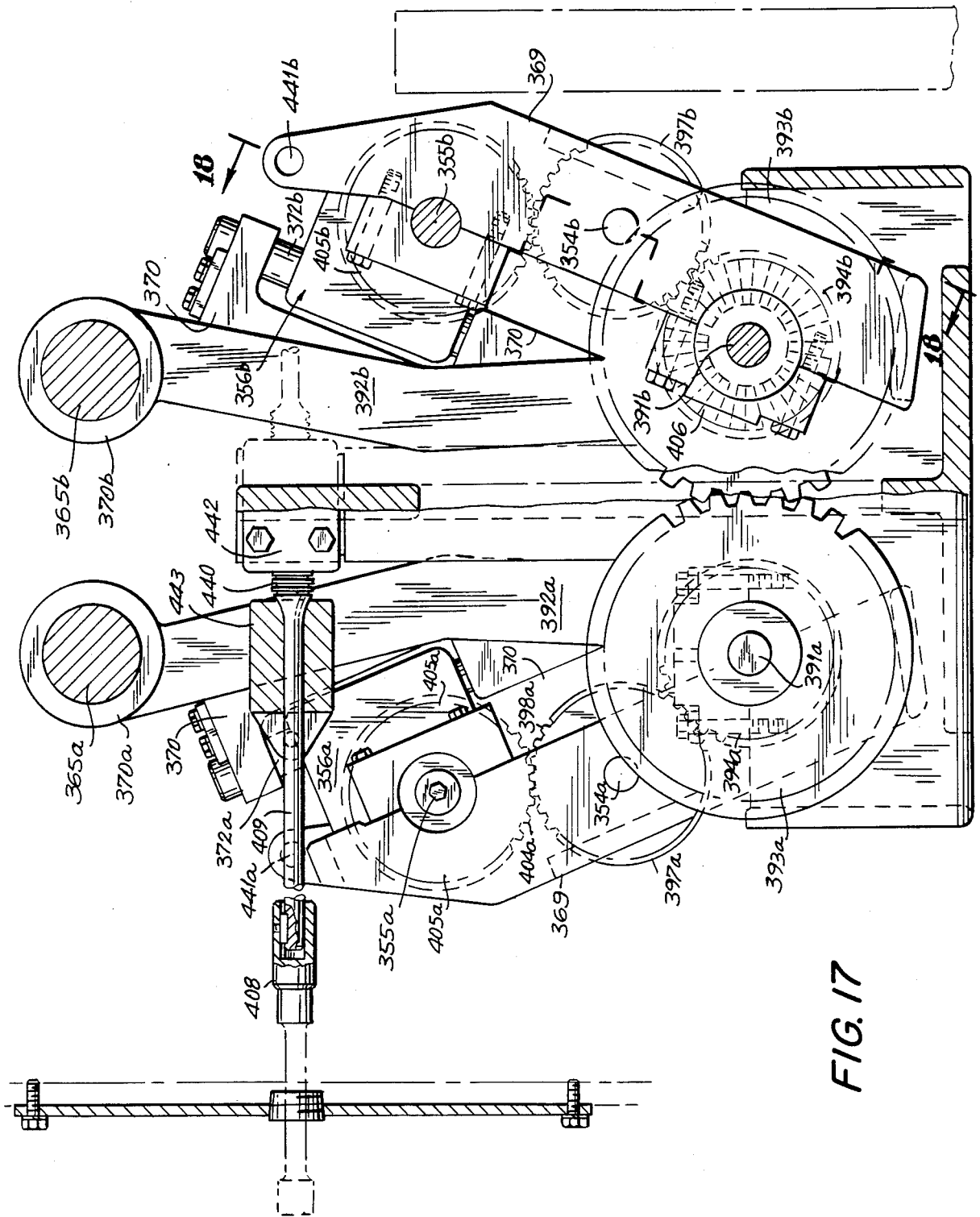
FIG. 17 is a rear view of the volume control assembly in accordance with the present invention.
Figure 18:
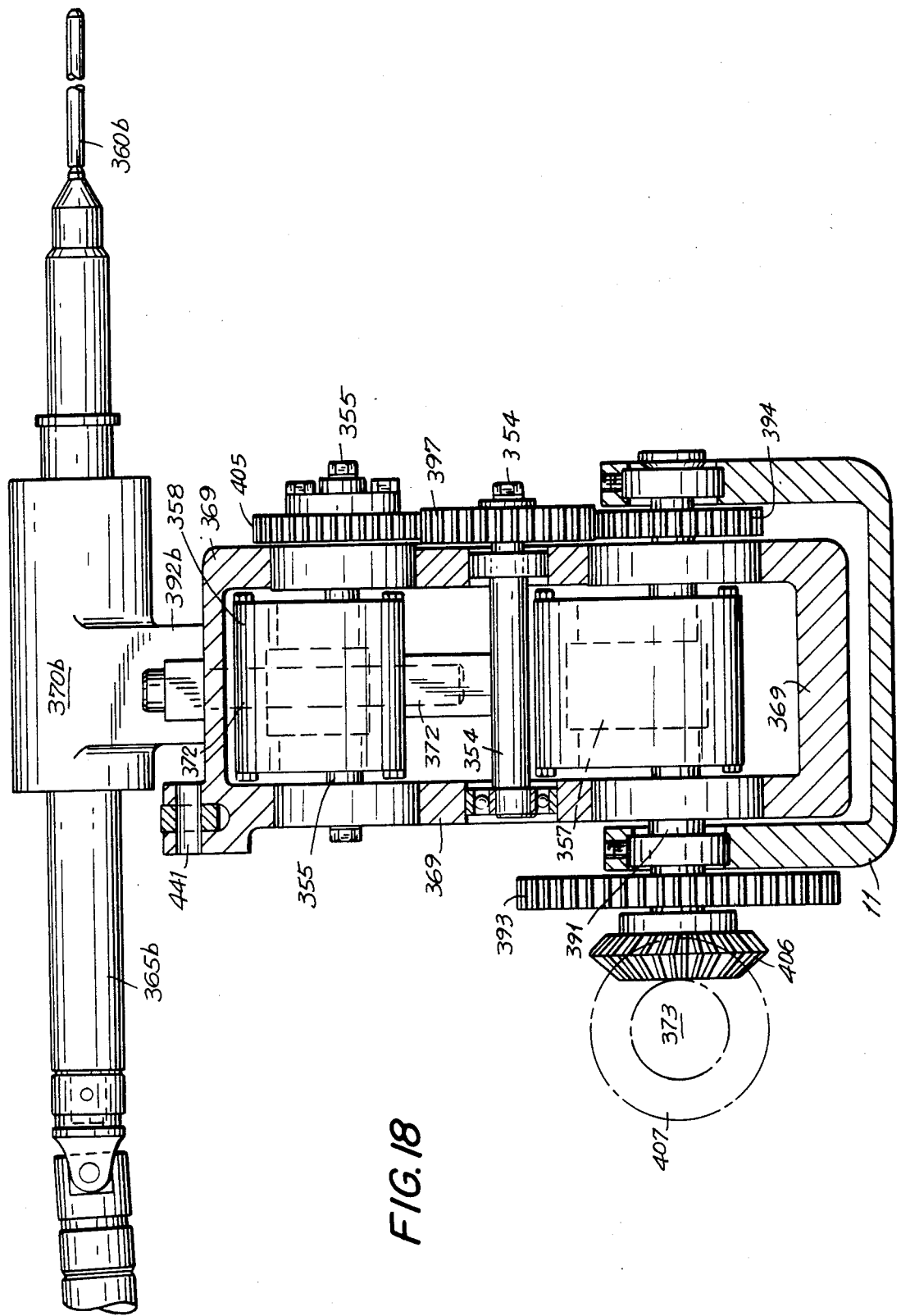
FIG. 18 is a side sectional view of FIG. 17 taken along line 18—18.
Figure 34:
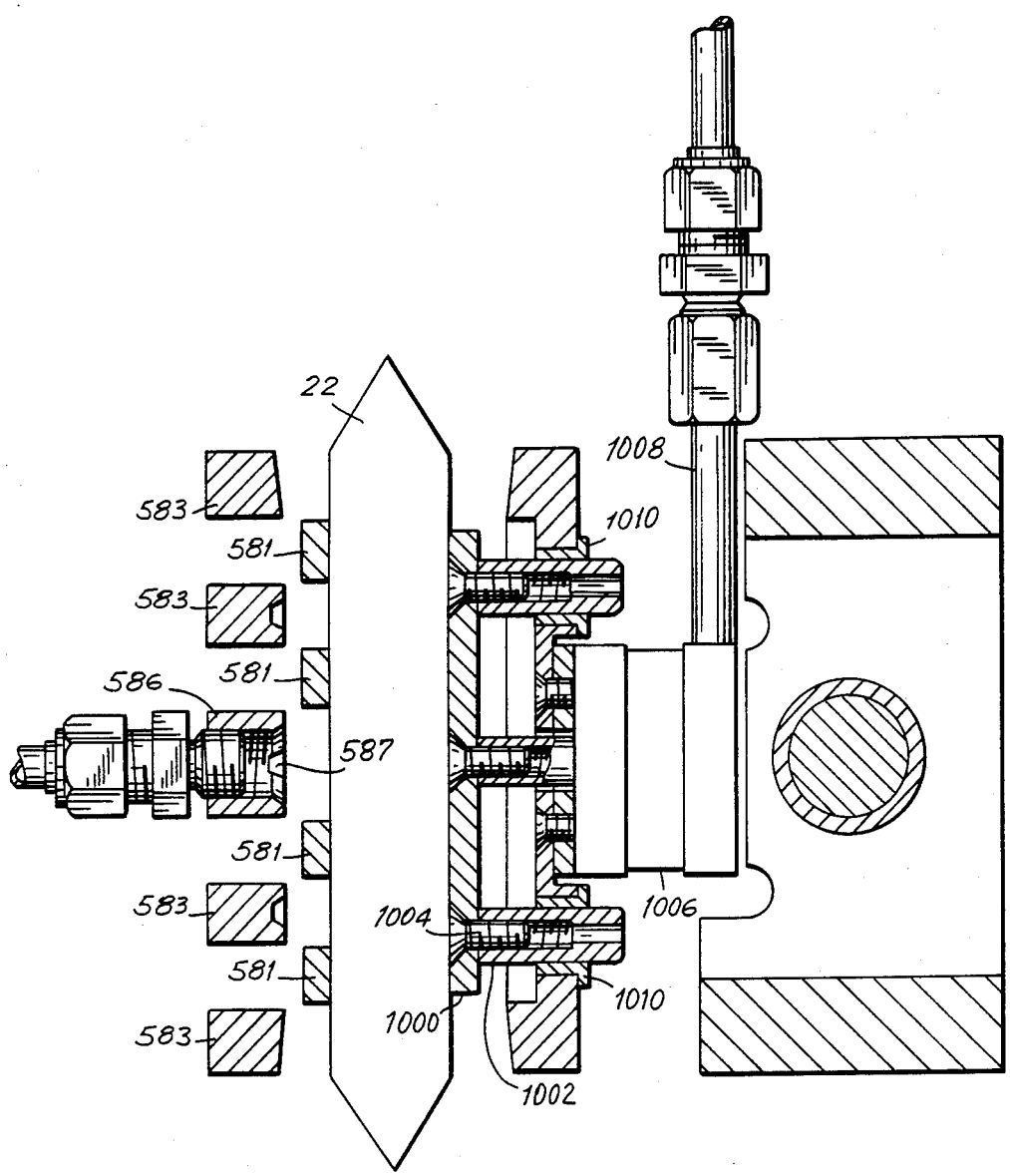
FIG. 34 is a top sectional view of FIG. 21 taken along line 34—34.
Figures 35, 36:
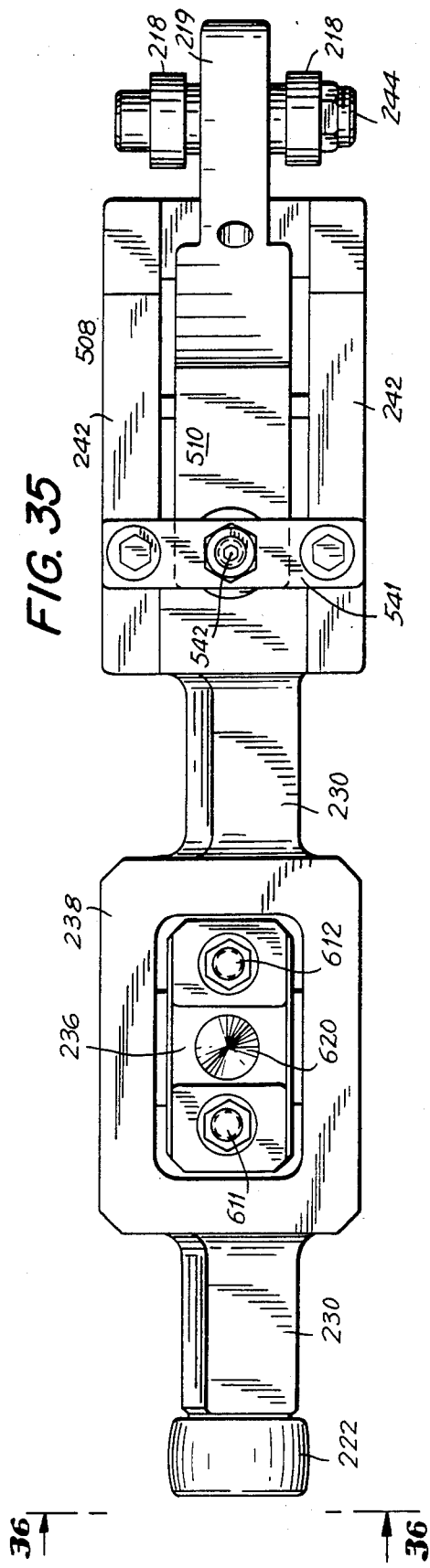
FIG. 35 is a rear view of FIG. 29.
FIG. 36 is and end view of FIG. 35 taken along line 36—36.
Figure 38:
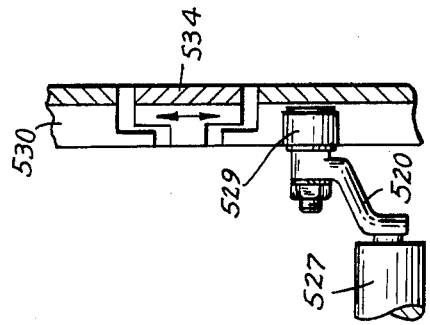
FIG. 38 is a top sectional view of the volume control cam shown in FIG. 42.

The primary volume control apparatus incorporates the volume control fingers and the pusher plate. Volume control fingers 360a and 360b contact the tube at right angles to the transverse clampings of the sealing mechanisms, at a location between adjacent sealing mechanisms. This contact tends to reduce the size of the tube and decrease the volume. In order to fix how far open the tube is spread near the area of contact, and how much product is in the tube section to be clamped off, pusher plate 1000 from the sealing mechanism about to be closed, and fingers 581 of upper flange 583 of mounting bracket 572 of the preceding sealing mechanism, are arranged on opposite sides of tube 22 oriented at right angles to volume control fingers 360. Pusher plate 1000 is activated by air cylinder 1006 and air source 1008 to extend from flange 603 to a position where it will contact and thus confine the motion and, hence, the volume of tube 22 as the sealing mechanism closes transversely. Fingers 581, affixed to the preceding sealing mechanism, each have beveled face 1012 as shown in FIG. 8. Thus, as the preceding sealing mechanism continues to advance, fingers 581 rotate about the axis of the sealing mechanism towards tube 22, and contact tube 22, preferably so that face 1012 is roughly parallel to plate 1000, to confine the movement of and, hence, the volume of tube 22 as the trailing sealing mechanism closes. This cooperative effect is shown in FIGS. 21 and 34.

As discussed, movable cam 534 also may be used in controlling volume by selecting where along tube 22 the sealing mechanism transversely clamps the tube. This clamping location affects the volume because the preceding, sealing mechanism, having already clamped tube 22, causes the leading edge of tube 22 to deviate from its downward linear path as the leading edge advances about the periphery of cross seal wheel 200. This change of direction alters the tube cross sectional configuration and alters the volume. Consequently, depending upon where along tube 22 the following sealing mechanism clamps tube 22, the volume may be adjusted.

Once the volume is fixed, and tube 22 is transversely clamped, air supply 1008 is closed and pusher plate 1000 can be pressed back flush into flange 603 by clamped package 30 during the bricking operation as the orientation of the leading sealing mechanism retards to press package 30 against the flanges to its rectangular brick shape. As the leading sealing mechanism retards, fingers 581 now rotate away from package 30, and pass by fingers 583 of flange 584 of the following sealing mechanism. The action of fingers 581 during the bricking operation are shown schematically in FIG. 41 where the leading sealing mechanism, shown by anvil surface 600a and secondary induction coil 224a is rotated α degrees towards the trailing sealing mechanism shown by flanges 603b, anvil surface 601b, secondary induction coil 224b flange 584. Seven steps are shown, numbered 1–7.

We claim:

1. Apparatus for use in a machine for forming a plurality of sealed packages from an advancing tube of polyfoil web filled with a product, comprising:
   a structure mounted in the machine and adapted to rotate about an axis at a controllable speed;
   a plurality of sealing mechanisms mounted in a spaced apart relationship about the periphery of the structure, each sealing mechanism further comprising
      a sealing jaw and an anvil jaw pivotably connected together so that one of the sealing or anvil jaws is mounted parallel to the axis of the structure, the sealing mechanism having an open position and a closed position, the closed position having the anvil and sealing jaws being transversely clamped together in parallel about the tube to form a clamped package,
      means for sealing the tube area clamped between the sealing jaw and anvil jaw to form a sealed package,
      means for severing the transverse seal area, and
      a plurality of flanges;
   means for closing each sealing mechanism as it approaches a preselected location in its path of travel, the location being proximate to the advancing tube so that closing the sealing mechanism transversely compresses the tube flat between the sealing jaw and anvil jaw; and
   means for preforming sealed packages clamped between adjacent sealing mechanisms by compressing the clamped sealed package against the boundary created by the flanges of the adjacent sealing mechanisms.

2. The apparatus of claim 1 wherein the structure is a cylindrical wheel having parallel flanges adapted for receiving the plurality of sealing mechanisms.

3. The apparatus of claim 1 wherein the means for severing the sealed tube area further comprises a knife mounted in the anvil jaw having a retracted position within the anvil jaw and an extended position sufficient to pass the knife through the sealed tube area.

4. The apparatus of claim 1 further comprising a volume control means for controlling the tube configuration and the volume of product in the tube before the tube is transversely clamped to form a clamped package.

5. The apparatus of claim 4 wherein the volume control means further comprises means for controlling the orientation of each sealing mechanism as it closes about the tube at the predetermined location to control the volume of product in each clamped package.

6. The apparatus of claim 4 wherein the volume control means further comprises a contacting means for contacting the polyfoil tube to adjust the tube configuration before the tube is transversely clamped to control the volume of product in the tube proximate to the point of contact before the tube is transversely clamped.

7. The apparatus of claim 6 wherein the contacting means further comprises a pair of fingers oriented to trace elliptical paths having substantially the same major and minor axis and oriented in opposition, moving in opposite rotations and at an angle to each other, so that the fingers contact the polyfoil tube on opposite sides while moving in the same direction at about the same speed.

8. The apparatus of claim 4 wherein the volume control means further comprises, for each sealing mechanism, a pressing surface extending from the jaw mounted parallel to the axis of rotation, and a pusher plate mounted in a preforming flange on the other jaw, the pusher plate having an extended position for controlling the volume of product in the tube and a retracted position for preforming the tube, and said presser plate and flange cooperate as the sealing mechanism is closing to confine the tube to a predetermined configuration as the tube is transversely clamped to control the volume of product in the tube.

9. The apparatus of claim 8 wherein the pressing surface of one jaw of a sealing mechanism and the pusher plate of the other jaw and the adjacent and trailing sealing mechanism cooperate as the trailing sealing mechanism is closing to confine the tube to a predetermined configuration as the tube is transversely clamped to control the volume of product in the tube.

10. The apparatus of claim 1 wherein the sealing means further comprises a secondary induction coil mounted in the sealing jaw, the coil being adapted to respond to a first electromagnetic field as said coil passes therethrough and thereby generate a second electromagnetic field to induce a current in the polyfoil tube to heat and seal the transversely clamped tube area.

11. The apparatus of claim 1 wherein the means for preforming packages further comprises means for altering the relative orientation of adjacent sealing mechanisms to compress a clamped package against the plurality flanges to conform the package into a configuration bounded by the flanges.

12. The apparatus of claim 2 wherein one of the sealing jaw or anvil jaw is mounted in the cylindrical flanges of the rotating wheel and is rotatable about a jaw axis, and the apparatus further comprises:
   a lever arm secured to one end of the rotatably mounted jaw;
   a first fixed cam, mounted in the machine, having a first cam groove; and
   a first cam follower adapted for running in the first cam groove and secured to the end of the lever arm so that the location of the first cam follower relative to the jaw axis as determined by the first cam groove determines the orientation of the rotatably mounted jaw and the sealing mechanism.

13. The apparatus of claim 12 wherein the means for preforming packages further comprises first and second path segments in the first cam groove for positioning the first cam follower in preselected locations and the sealing mechanisms in corresponding preselected orientations relative to the jaw axis, the first path segment being configured to place a sealing mechanism in an advanced angular orientation, the angular orientation of the sealing mechanism being the plane in which the sealing jaw and anvil jaw move relative to each other and in which the severing means would move, an advanced orientation being the outermost portion of the sealing mechanism plane traveling in front of where it would the if the plane extended through the axis of the rotating wheel, the second path segment being configured to have the position of the first cam follower relative to the jaw axis to change the orientation of a sealing mechanism from an advanced to a retarded orientation, the retarded orientation being the outermost portion of the sealing mechanism plane traveling behind where it would be if the plane extended through the axis of the rotating wheel, the length and orientation of the first and second path segments being selected so that the first cam follower associated with the leading sealing mechanism running from the first to the second path segments changes the sealing mechanism orientation to a retarded orientation while the first cam follower associated with the trailing sealing mechanism running in the first path segment provides the trailing sealing mechanism with an advanced orientation so that the package clamped between the adjacent sealing mechanisms is compressed against the flanges of the sealing mechanisms for a period of time sufficient to preform the package.

14. The apparatus of claim 13 wherein the first cam groove further comprises a third path segment following the second path segment in sequence and configured to advance the retarded orientation of the leading sealing mechanism to a rest orientation, the rest orientation being sufficient to permit transfer of the preformed package from the rotating wheel.

15. The apparatus of claim 14 wherein the first cam groove further comprises:

a fourth path segment disposed prior in sequence to the first path segment;

a movable cam segment located in the fourth path segment having a plurality of positions between a front position and a rear position, including a nominal position between the front and rear positions, the front position corresponding to one of a predetermined relative maximum advance or relative maximum retard in angular orientation, the rear position of the movable cam segment corresponding to the other of the relative maximum advance or retard in orientation, the nominal position corresponding to the nominal clamping position; and a means for moving the movable cam segment to one of the plurality of locations to configure the fourth path segment to control the angular orientation of the sealing mechanism as it closes about the tube depending upon the location of the movable cam segment between its front and rear positions so that movement of the moveable cam from the nominal position to either the front or rear position gradually increases the change in angular orientation from the nominal orientation to the relative maximum advance or retard orientation.

16. The apparatus of claim 2 further comprising:

a cam mounted in the machine having a cam groove in a predetermined path about the axis of revolution of the wheel; and, for each sealing mechanism, a cam follower adapted for running in the cam groove;

a linked lever arm and pushrod means for interconnecting the cam follower and the pivot of the sealing mechanism so that the linked lever arm and pushrod means causes the sealing mechanism to open and close the anvil and sealing jaws as the cam follower moves either towards or away from the axis of the wheel as the cam follower advances along the cam groove, thereby controlling the relative locations of the anvil and sealing jaw.

17. A method for forming a plurality of sealed packages from an advancing tube of filled polyfoil material for use in a form, fill, and seal machine, including the steps comprising:

advancing the polyfoil tube filled with product;

rotating a structure, said structure having a plurality of sealing mechanisms peripherally mounted thereon in a spaced apart relationship, each sealing mechanism comprising a sealing jaw and an anvil jaw pivotably connected together so that one of the sealing or anvil jaws is mounted on the structure transversely to the tube, each sealing mechanism having an open position and a closed position, the closed position having the anvil and sealing jaws being transversely clamped in parallel about the tube;

closing the sealing mechanisms at a predetermined location so that the tube is sequentially transversely clamped between the anvil jaw and sealing jaw of each sealing mechanism as each sealing mechanism passes the predetermined location to form a clamped package;

sealing the transversely clamped tube in the clamped area to form a seal and a sealed package;

severing the tube through the clamped seal area; and compressing the sealed package against a plurality of flanges extending from the adjacent sealing mechanisms thereby preforming the sealed package.

18. The method of claim 17 wherein severing the transversely clamped seal area further comprises extending a serrated knife from a housing in the anvil jaw through the seal area into a corresponding receptacle in the sealing jaw.

19. The method of claim 17 further comprising controlling the volume of product in the tube to be clamped by controlling the configuration of the tube as each sealing mechanism closes so that the volume of product in each clamped package is substantially the same.

20. The method of claim 19 wherein controlling the volume of product further comprises configuring the angular orientation of the sealing mechanism as it closes at the predetermined location to control the relative volume of product in each package.

21. The method of claim 19 wherein controlling the volume of product further comprises contacting the tube with a member at a location below where each sealing mechanism closes and above the preceding closed sealing mechanism to adjust the configuration of the tube and thereby control the volume of product in the tube as each sealing mechanism closes.

22. The method of claim 21 wherein contacting the tube with a member further comprises contacting the tube with a pair of opposing fingers which contact opposite sides of the tube substantially simultaneously, the fingers having opposing reciprocating movement.

23. The method of claim 19 wherein controlling the volume of product further comprises:
   contacting the tube with a first boundary surface, contacting the tube on an opposing side with a second boundary surface, the first and second boundary surfaces providing a predetermined tube configuration to control the volume of product in the tube; and
   closing a sealing mechanism after the tube has been given the predetermined tube configuration to clamp the tube transversely to fix the volume of product clamped in the tube.

24. The method of claim 23 wherein each sealing mechanism has a first boundary surface on one of the sealing or anvil jaws and a second boundary surface on the other of the sealing or anvil jaws and contacting the tube further comprises:
   contacting the tube with a first boundary surface on one of the sealing or anvil jaws of a sealing mechanism, said first boundary surface further comprising a flange extending from the jaw; and
   contacting the tube with a second boundary surface on an adjacent sealing mechanism, said second boundary surface further comprising an extendable plate and a means for extending and maintaining the plate extended to contact the tube, wherein one of the sealing mechanisms is about to clamp the tube transversely, the adjacent sealing mechanism being already clamped.

25. The method of claim 23 wherein sealing the transversely clamped tube further comprises:
   energizing a transverse induction coil mounted in the sealing mechanism to generate an electromagnetic field for a period of time;
   inducing a current in the polyfoil tube proximate to the energized transverse induction coil and the generated electromagnetic field to heat and fuse the tube together; and
   de-energizing the transverse induction coil so that the clamped heated and fused tube will cool and form a transverse seal.

26. The method of claim 17 wherein compressing the sealed packages further comprises altering the relative orientation of the adjacent sealing mechanisms to compress a package against the plurality of flanges to conform the package into the configuration bounded by the flanges.

27. The method of claim 17 further comprising controlling the orientation of the sealing mechanisms by adjusting orientation of the jaw mounted transversely to the tube about a jaw axis of rotation.

28. The method of claim 27 wherein controlling the orientation further comprises:
   mounting one of the anvil or sealing jaws of the sealing mechanism in the structure for rotation about an axis and providing that jaw with a lever arm and a first cam follower attached to the end of the first lever arm; and
   controlling the angular orientation of the sealing mechanism by controlling the location of the first cam follower relative to the jaw axis by passing the first cam follower through a corresponding first cam groove as the structure is advanced so that motion of the first cam follower relative to the jaw axis controls the orientation of the sealing mechanism.

29. The method of claim 28 wherein controlling the angular orientation of the sealing mechanism further comprises:
   positioning the first cam follower in one of a first or second path segments in the first cam groove as the structure advances and the first cam follower follows the path of the first cam groove, passing first through the first path segment and thereafter through the second path segment,
   the first path segment being configured to place a sealing mechanism in an advanced angular orientation, the angular orientation of the sealing mechanism being the plane in which the sealing jaw and anvil jaw move relative to each other, an advanced orientation being the outermost portion of the sealing mechanism plane traveling in front of where it would be if the plane extended through the axis of the rotating wheel,
   the second path segment being configured to move the position of the first cam follower relative to the jaw axis to change the orientation of a sealing mechanism from an advanced to a retarded orientation, the retarded orientation being the outermost portion of the sealing mechanism plane traveling behind where it would be if the plane extended through the axis of the rotating wheel, the length and orientation of the first and second path segments being selected so that the first cam follower associated with the leading sealing mechanism running from the first to the second path segments changes the sealing mechanism orientation to a retarded orientation while the first cam follower associated with the trailing sealing mechanism running in the first path segment provides the trailing sealing mechanism with an advanced orientation so that the package clamped between the adjacent sealing mechanisms is compressed against the flanges of the sealing mechanisms for a period of time sufficient to preform the package.

30. The method of claim 29 wherein closing the sealing mechanisms at a predetermined location further comprises:
   positioning the first cam follower in a third path segment corresponding to the predetermined location prior in sequence to the first path segment, the third path segment being configured with a movable cam segment having a plurality of positions between a front position and a rear position including a nominal position between the front and rear positions, the front position causing the first cam follower to be positioned so that the sealing mechanism is in one of a predetermined relative maximum advance or relative maximum retard in angular orientation, the rear position corresponding to the other of the relative maximum advance or retard in angular orientation, and the nominal position corresponding to the nominal clamping position;
   determining whether the orientation of the next sealing mechanism to be closed must be advanced or retarded relative to the angular orientation of the preceding sealing mechanism; and
   moving the movable cam in the third path segment to the position in the third path segment thereby providing the sealing mechanism with the determined angular orientation so that the closing of the sealing mechanism occur with the desired volume of product within the clamped tube.

31. The method of claim 17 wherein the opening and closing of a sealing mechanism further comprises:
  positioning a cam follower in a cam groove of a cam, the cam groove having a path configured to move the cam follower relative to the fixed point;
  connecting the cam follower to the pivot connecting the anvil and sealing jaws using a linked pushrod and lever arm mechanism; and
  moving the cam follower relative to the fixed point as the sealing mechanism advances so that relative motion of the cam follower actuates the linked pushrod and lever arm mechanism to operate the hinge to close the anvil jaw and sealing jaw at the predetermined location and to open the anvil jaw and sealing jaw at a second predetermined location after the package has been sealed, pre-bent, and severed.

32. Apparatus for controlling the orientation of sealing mechanisms for use in a machine for forming a plurality of sealed packages from an advancing tube filled with a product having a plurality of sealing mechanisms mounted in a spaced apart relationship about the periphery of a structure adapted for rotation about an axis at a controllable speed, adjacent leading and trailing sealing mechanisms being capable of tranversely clamping a length of product filled tube therebetween, comprising:
  means for mounting each sealing mechanism in the structure adapted for rotation about a first axis, the sealing mechanism having a nominal angular orientation wherein a sealing mechanism plane passes through the transversely clamped tube at a nominal angle to a plane passing through the first axis and the axis of the rotating wheel;
  a lever arm secured to each sealing mechanism;
  a first fixed cam having a first cam groove mounted in the machine;
  a first cam follower secured to the end of each lever arm and adapted for running in the first cam groove so that for each sealing mechanism, the location of the first cam follower relative to the first axis, as determined by the first cam groove configuration, determines angular orientation of the sealing mechanism.

33. The apparatus of claim 32 for use in preforming packages wherein the first cam groove further comprises first and second path segments in the first cam for positioning the first cam followers in preselected locations and the sealing mechanisms in corresponding preselected orientations relative to the first axis, the first path segment being configured to place a sealing mechanism in the nominal angular orientation being an advanced orientation with the outermost portion of the sealing mechanism plane traveling in front of where it would be if the sealing mechanism plane were in a radial orientation, the second path segment being configured to change the position of one of the first cam followers relative to the first axis as the first cam advances along the second path to change the orientation of the corresponding sealing mechanism from an advanced to a retarded orientation, the retarded orientation being the outermost portion of the sealing mechanism plane traveling behind where it would be if the sealing mechanism plane were in a radial orientation, the length and orientation of the first and second path segments being selected so that the first cam follower associated with the leading sealing mechanism running from the first to the second path segments changes the sealing mechanism orientation to a retarded orientation while the first cam follower associated with the trailing sealing mechanism running in the first path segment provides the trailing sealing mechanism with an advanced orientation so that the sealed package clamped between the adjacent sealing mechanisms is compressed for a period of time sufficient to preform the package.

34. The apparatus of claim 33 wherein the first cam groove further comprises:
  a third path segment disposed prior in sequence to the first path segment;
  a movable cam segment located in the third path segment having a plurality of positions between a front position and a rear position, including a nominal position between the front and rear positions, the front position corresponding to one of a predetermined maximum advance or maximum retard in angular orientation, the rear position of the movable cam segment corresponding to the other of the maximum advance or retard in orientation, the nominal position corresponding to the nominal angular orientation of the sealing mechanism; and
  means for moving the movable cam segment to one of the plurality of locations to configure the third path segment to control the angular orientation of the sealing mechanism as it closes about and transversely clamps the tube.

35. The apparatus of claim 33 wherein the sealing mechanism further comprise a plurality of flanges oriented so that when the leading sealing mechanism is in a retarded orientation and the trailing sealing mechanism is an advanced orientation the transversely clamped tube section is preformed substantially into the configuration bounded by the flanges.

36. The apparatus of claim 34 wherein the volume bounded by the flanges is about 97% of the final volume for the configuration of a finished package.

* * * * *

UNITED STATES PATENT AND TRADEMARK OFFICE
CERTIFICATE OF CORRECTION

PATENT NO. : 4,817,366
DATED : April 4, 1989
INVENTOR(S) : Konzal et al.

It is certified that error appears in the above-identified patent and that said Letters Patent is hereby corrected as shown below:

Column 10, line 35, "t" should be --to--

Column 11, line 20, "nd" should be --and--

Column 25, line 15, "the" should be --be--

Column 27, line 35, "23" should be --17--

Signed and Sealed this

Seventeenth Day of March, 1992

Attest:

HARRY F. MANBECK, JR.

*Attesting Officer*     *Commissioner of Patents and Trademarks*